(12) United States Patent
Shimozono

(10) Patent No.: US 7,283,452 B2
(45) Date of Patent: *Oct. 16, 2007

(54) OBJECTIVE LENS HAVING TWO ASPHERIC SURFACES AND A PHASE SHIFTER AND OPTICAL DEVICE INCLUDING THE SAME

(75) Inventor: Hiroaki Shimozono, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 277 days.

This patent is subject to a terminal disclaimer.

(21) Appl. No.: 10/355,146

(22) Filed: Jan. 31, 2003

(65) Prior Publication Data

US 2003/0117931 A1 Jun. 26, 2003

Related U.S. Application Data

(63) Continuation of application No. PCT/JP01/06596, filed on Jul. 31, 2001.

(30) Foreign Application Priority Data

Jul. 31, 2000 (JP) ............................... 2000-232184

(51) Int. Cl.
G11B 7/095 (2006.01)
(52) U.S. Cl. ............................... 369/112.24; 369/44.32; 369/53.14
(58) Field of Classification Search ........... 369/112.24, 369/112.17, 44.32, 53.14
See application file for complete search history.

(56) References Cited

U.S. PATENT DOCUMENTS 4,929,956 A * 5/1990 Lee et al. .................... 342/376

| 5,303,221 | A | 4/1994 | Maeda et al. |
| 5,513,158 | A | 4/1996 | Ohsato |
| 5,600,614 | A | 2/1997 | Katayama |
| 5,615,200 | A | 3/1997 | Hoshino et al. |
| 5,638,353 | A | 6/1997 | Takahashi |
| 5,659,533 | A | 8/1997 | Chen et al. |
| 5,665,957 | A | 9/1997 | Lee et al. |
| 5,696,750 | A | 12/1997 | Katayama |

(Continued)

FOREIGN PATENT DOCUMENTS

EP 0 587 297 3/1994

(Continued)

OTHER PUBLICATIONS

Patent Abstracts of Japan, JP 11-287948, Oct. 19, 1999 (Non-English reference was filed on Jan. 31, 2003).

(Continued)

Primary Examiner—Gautam R. Patel
(74) Attorney, Agent, or Firm—Oblon, Spivak, McClelland, Maier & Neustadt, P.C.

(57) ABSTRACT

An objective lens in which a first wavelength is used in reading a first optical disk, a second wavelength is used in recording or reading a second optical disk, and a phase shifter provided with annular step portions having a center coincident with an optical axis is formed in a single surface of the objective lens, the phase shifter producing a phase difference with respect to light having the first wavelength and light having the second wavelength, is presented. The objective lens can read well both a CD and a DVD.

9 Claims, 16 Drawing Sheets

U.S. PATENT DOCUMENTS

| | | | |
|---|---|---|---|
| 5,703,856 A | 12/1997 | Hayashi et al. | |
| 5,703,862 A | 12/1997 | Lee et al. | |
| 5,717,674 A | 2/1998 | Mori et al. | |
| 5,734,637 A | 3/1998 | Ootaki et al. | |
| 5,754,512 A | 5/1998 | Komma et al. | |
| 5,768,242 A | 6/1998 | Juday | |
| 5,809,000 A | 9/1998 | Choi | |
| 5,815,293 A | 9/1998 | Komma et al. | |
| 5,912,868 A | 6/1999 | Hayashi et al. | |
| 5,930,214 A | 7/1999 | Kasahara et al. | |
| 6,017,659 A * | 1/2000 | Lee et al. | 430/5 |
| 6,040,943 A * | 3/2000 | Schaub | 359/565 |
| 6,061,324 A | 5/2000 | Arai et al. | |
| 6,118,594 A | 9/2000 | Maruyama | |
| 6,118,749 A | 9/2000 | Arai et al. | |
| 6,134,055 A | 10/2000 | Koike | |
| 6,215,756 B1 * | 4/2001 | Shimano et al. | 369/112.26 |
| 6,243,349 B1 | 6/2001 | Arai et al. | |
| 6,256,284 B1 | 7/2001 | Shimano et al. | |
| 6,285,645 B1 * | 9/2001 | Shimozono | 369/112.24 |
| 6,363,037 B1 * | 3/2002 | Yamazaki | 369/112.26 |
| 6,462,874 B1 * | 10/2002 | Soskind | 359/565 |
| 6,717,906 B1 * | 4/2004 | Shimano | 369/112.26 |
| 6,873,588 B1 * | 3/2005 | Mizuno et al. | 369/112.01 |
| 2001/0005351 A1 | 6/2001 | Shimano et al. | |
| 2001/0017830 A1 | 8/2001 | Arai et al. | |

FOREIGN PATENT DOCUMENTS

| | | |
|---|---|---|
| EP | 0 747 893 | 12/1996 |
| EP | 0 803 867 | 10/1997 |
| EP | 0962921 | 12/1999 |
| EP | 1122573 | 8/2001 |
| EP | 1 143 429 A2 | 10/2001 |
| JP | 4-178931 | 6/1992 |
| JP | 5-81698 | 4/1993 |
| JP | 6-96466 | 4/1994 |
| JP | 6-259804 | 9/1994 |
| JP | 11-287948 | 10/1999 |
| JP | 2000-81566 | 3/2000 |
| JP | 2000-268392 | 9/2000 |
| JP | 2000-311374 | 11/2000 |
| JP | 2001-229567 | 8/2001 |
| WO | WO 00/00964 | 1/2000 |

OTHER PUBLICATIONS

U.S. Appl. No. 09/822,356, filed Apr. 2, 2001, Shimozono.
U.S. Appl. No. 10/355,146, filed Jan. 31, 2003, Shimozono.

* cited by examiner

OBJECTIVE LENS HAVING TWO ASPHERIC SURFACES AND A PHASE SHIFTER AND OPTICAL DEVICE INCLUDING THE SAME

TECHNICAL FIELD

The present invention relates to an objective lens adapted to recording or reading an optical disk such as a CD (compact disk), a DVD (digital video disk) etc., having a diffraction-limited performance, and to an optical device using such objective lens. The CD includes a recordable CD-R (compact disk recordable).

The present invention is to provide an objective lens capable of correcting well both the on-axial aberration and the off-axial aberration in recording or reading a second optical disk, and an optical device using such objective lens.

BACKGROUND ART

There have been proposed objective lenses for reading both a DVD comprising a transparent substrate having a thickness of 0.6 mm and a CD comprising a transparent substrate having a thickness of 1.2 mm (JP-A-10-255305, JP-A-11-16190, JP-A-11-2759).

In these conventional techniques, a phase shifter having a concave portion or a convex portion, which is formed in an annular belt-like shape around the optical axis as the center, is provided in a surface of the objective lens having an aspheric surface. The basic structure of the objective lens is optimized so as to be capable of reading a DVD, preferably. When a CD is to be read, the phase is corrected by the phase shifter so that the aberration is made as small as possible. As a result, for both DVD and CD, the correction can preferably be achieved with respect to the on-axial aberration, in particular, the on-axial spherical aberration.

In the conventional techniques, however, a preferred correction could not be achieved with respect to the off-axial coma aberration at the time of reading a CD. Namely, since the off-axial coma aberration was large, the optical performance showed a large reduction when the light source, the objective lens, etc. were inclined from the optical axis or shifted from the optical axis. Therefore, high accuracy was required in positioning the objective lens, etc. in assembling the optical device. Hence, productivity was poor.

Further, in the requirement of high accuracy in the determination of the position of the objective lens, if a mechanism for moving the lens or the light source (a moving mechanism) was worn out, the objective lens was inclined or shifted from the optical axis, whereby there caused gradual deterioration of the optical performance with a lapse of time.

Further, since the off-axial coma aberration was large, an allowable range to the positional determination of the objective lens, in particular, a deviation of the axis in autofocus driving to the objective lens became narrow when the optical device was actually operated. Therefore, there was the problem that the optical performance was reduced.

An object of the present invention is to solve the above-mentioned disadvantages, and to provide an, objective lens capable of correcting well both the on-axial aberration and the off-axial aberration when plural kinds of optical disks such as, for example, DVD, CD, etc. are recorded or read, and to provide an optical device using the objective lens.

DISCLOSURE OF THE INVENTION

In accordance with the present invention, there is provided an objective lens having aspheric surfaces at both surfaces, used in an optical system in which light having a first wavelength is converged to the data recording surface of a first optical disk and reflection light from the data recording surface of the first optical disk is received by a light receiving element in recording or reading the first optical disk, and light having a second wavelength which is different from the first wavelength is converged to the data recording surface of a second optical disk and reflection light from the data recording surface of the second optical disk is received by the light receiving element in recording or reading the second optical disk, the objective lens being characterized in that a phase shifter provided with annular step portions W having a center coincident with an optical axis of the lens is formed in a single or both surfaces of the objective lens, wherein the phase shifter has function to produce a phase difference for reducing the aberration resulted in recording or reading the first optical disk with respect to the light having the first wavelength, and has function to produce a phase difference for reducing the aberration resulted in recording or reading the second optical disk with respect to the light having the second wavelength.

Further, according to the present invention, there is provided an optical device in which light having a first wavelength is converged to the data recording surface of a first optical disk via an objective lens and reflection light from the data recording surface of the first optical disk is received by a light receiving element in recording or reading the first optical disk, and light having a second wavelength which is different from the first wavelength is converged to the data recording surface of a second optical disk via the objective lens and reflection light from the data recording surface of the second optical disk is received by the light receiving element in recording or reading the second optical disk, the optical device being characterized in that the objective lens is the objective lens as described just above.

BEST MODE FOR CARRYING OUT THE INVENTION

Figure 1:
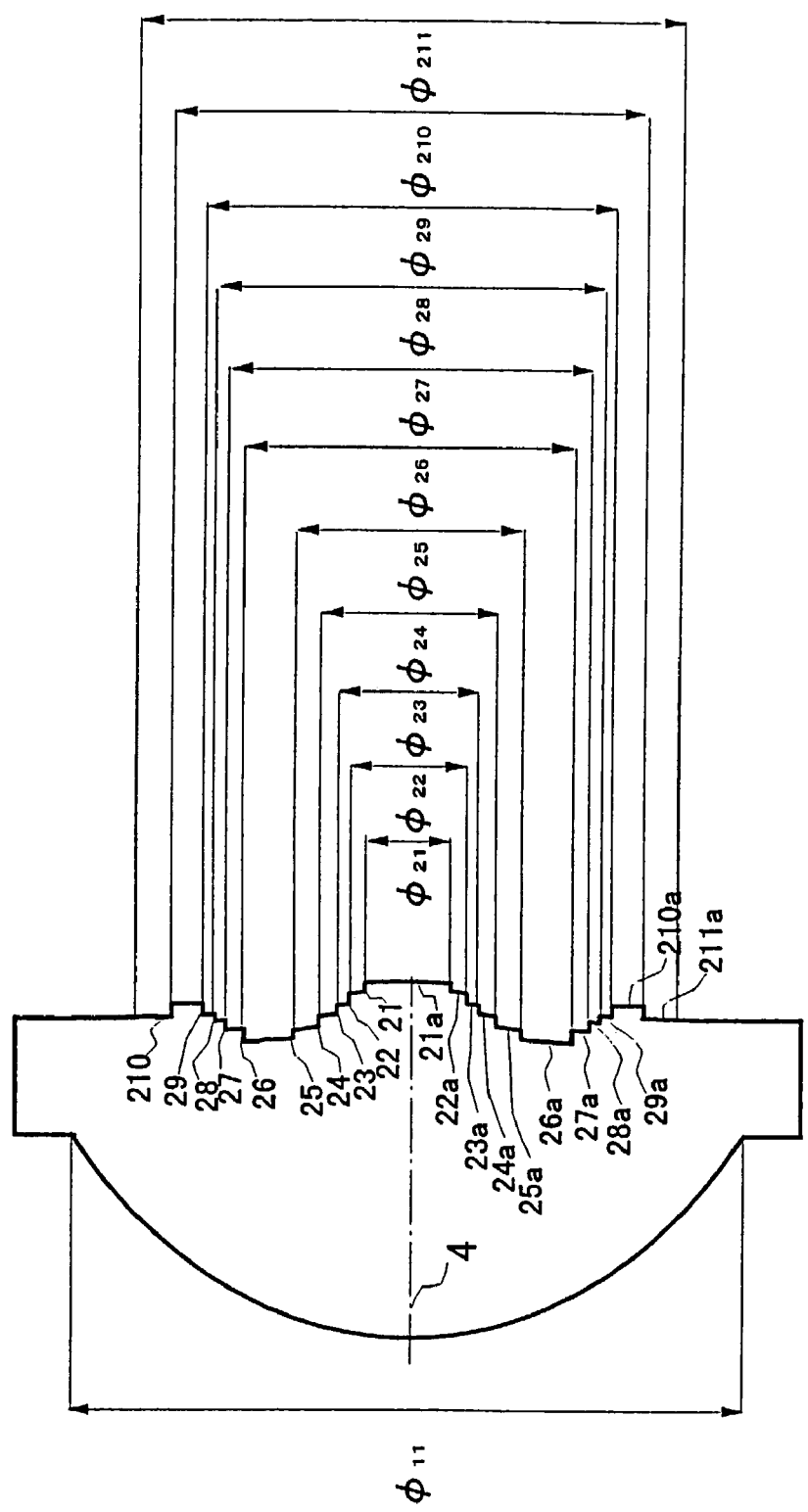
FIG. 1: a cross-sectional view showing an embodiment of the objective lens according to the present invention
Figure 2:
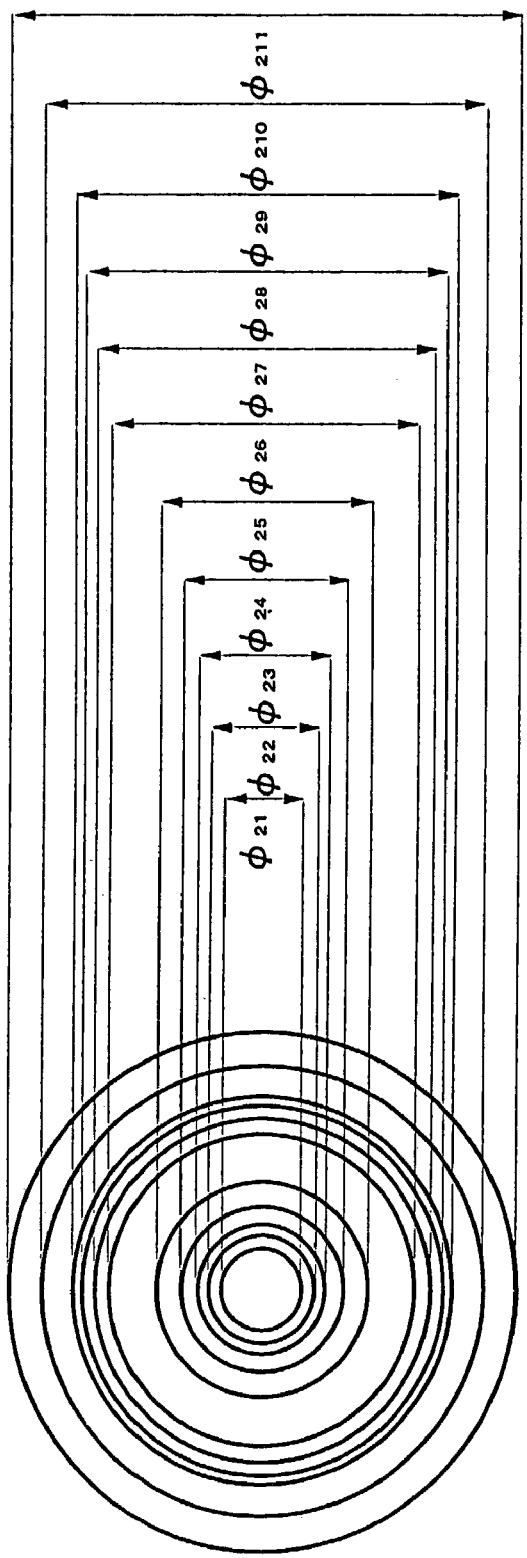
FIG. 2: a front view of the objective lens shown in FIG. 1 which is observed from a side of the light source

FIG. 1 is a cross-sectional view passing the optical axis 4 of the objective lens according to an embodiment of the present invention wherein the surface without having step portions is a first surface (the surface at a light source side). FIG. 2 is a front view of the objective lens shown in FIG. 1 when the lens is observed from a side of optical disk.

The objective lens of the present invention is used in an optical system in which light from light sources having different wavelengths with respect to two optical disks is converged to respective data recording surfaces of the optical disks, and reflection light from the respective data recording surfaces is received by a light receiving element in recording or reading the two optical disks, respectively. The objective lens of the present invention has aspheric surfaces in both surfaces in order to increase light converging accuracy. When a first optical disk is recorded or read, a first wavelength is used, and when a second optical disk is recorded or read, a second wavelength is used.

Although the objective lens of the present invention has the aspheric surfaces in both surfaces as described above, it is difficult to correct sufficiently the aberration with such measures. Accordingly, a phase shifter provided with annular step portions having centers coincident with the optical axis, is formed in a single or both surfaces of the objective lens.

In the objective lens shown in FIG. 1, annular step portions 21, 22, 23, 24, 25, 26, 27, 28, 29 and 210 having centers coincident with the optical axis are formed in the second surface (the surface at an optical disk side) of the objective lens. Among the step portions formed in the second surface, step portions 22, 23, 24, 25, 26, 27, 28, 29 and 210 have a phase shifting function to the first wavelength and the second wavelength, which constitute step portions W. Namely, the step portions having a phase shifting function to the first wavelength and a phase shifting function to the second wavelength is referred to as the step portions W.

A step portion X having a phase shifting function with respect only to the first wavelength may be formed in a single or both surfaces of the objective lens, and a step portion Y having a phase shifting function with respect only to the second wavelength may be formed in a single or both surfaces of the objective lens, as the case requires.

Namely, it is not always necessary that all of the plurality of step portions formed in a single or both surfaces of the objective lens are step portions W but a part of the plurality of step portions in a single or both surfaces of the objective lens may be used as step portions W. In more detail, at least one in the plurality of step portions may be the step portion X, and at least one in the plurality of step portions may be the step portion Y. The number of the step portions is not limited to those shown in FIG. 1, but can be changed discretionary.

By shifting the phase of light having the first wavelength, the on-axial spherical aberration of the first optical disk in recording or reading, is reduced particularly. By shifting the phase of light having the second wavelength, the on-axial spherical aberration of the second optical disk in recording or reading, is reduced particularly.

In the objective lens shown in FIG. 1, a phase shifter having annular step portions having a center coincident with an optical axis is formed in a single surface. Thus, it is preferable to form the phase shifter provided with step portions in a single surface of the objective lens in consideration of easiness of processing the objective lens. However, the present invention is not limited to such but phase shifters provided with step portions may be formed in both surfaces of the objective lens.

In FIG. 1, $\phi_{21}$, $\phi_{22}$, $\phi_{23}$, $\phi_{24}$, $\phi_{25}$, $\phi_{26}$, $\phi_{27}$, $\phi_{28}$, $\phi_{29}$ and $\phi_{210}$ designate respectively the diameter of an inner side of the step portions 21, 22, 23, 24, 25, 26, 27, 28, 29 and 210; $\phi_{211}$ designates an effective diameter of the second surface, and $\phi_{11}$ designates an effective diameter of the first surface.

The step portions W, the step portion X or the step portion Y may be constituted by a convex portion(s) or a concave portion(s) to be formed in the objective lens surface. Any step portion is not limited to such configuration that the angle, in a cross-sectional view passing the optical axis, is a right angle, but may be inclined gently. In the following description, dimensions such as distance, interval, length, thickness, etc. are expressed by a unit of mm unless specifically described.

In order to construct the step portions to have a phase shifting function to a first wavelength $\lambda_1$ and a second wavelength $\lambda_2$, it is preferable that in order to shift the phase of light having the first wavelength, dimensions and shapes of the step portions of the phase shifter are determined so that a phase difference caused by light having a first wavelength $\lambda_1$ is in a range of from $(i-0.1)\lambda_2$ to $(i+0.1)\lambda_2$ when it is converted into a distance, and in order to shift the phase of light having the second wavelength, dimensions and shapes of the step portions of the phase shifter are determined so that a phase difference caused by light having a second wavelength $\lambda_2$ is in a range of from $(j-0.1)\lambda_1$ to $(j+0.1)\lambda_1$ when it is converted into a distance wherein j represents a natural number, i represents a natural number and a phase difference multiplied by a natural number with respect to 360° is not deemed as the phase difference. When the phase difference is expressed by a value multiplied by a wavelength, it is deemed that the phase is converted into a distance.

In order to obtain such structure, it is preferable that the head γ of each annular step portion of the phase shifter, $\lambda_1$, $\lambda_2$, the refractive index $n_1$ of a material for the objective lens 3 with respect to the first wavelength and the refractive index $n_2$ of a material for the objective lens 3 with respect to the second wavelength satisfy the following Formula 1, more preferably, the following Formula 2.

$(i-0.1)\lambda_2/(n_2-1)+(j-0.1)\lambda_1/(n_1-1) \leq \gamma \leq (i+0.1)\lambda_2/(n_2-1)+(j+0.1)\lambda_1/(n_1-1)$  Formula 1

$(i-0.05)\lambda_2/(n_2-1)+(j-0.05)\lambda_1/(n_1-1) \leq \gamma \leq (i+0.05)\lambda_2/(n_2-1)+(j+0.05)\lambda_1/(n_1-1)$  Formula 2

Figure 3:
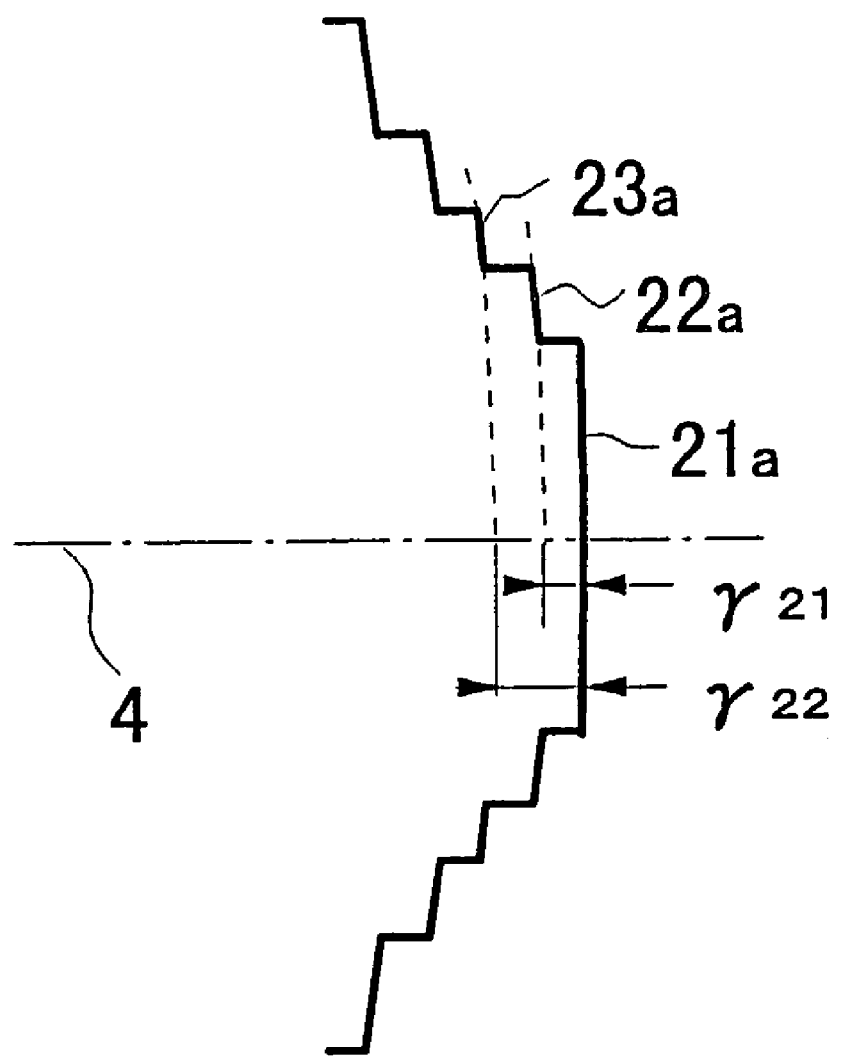
FIG. 3: an enlarged cross-sectional view around the optical axis of a second surface of the objective lens in FIG. 1

Here, in a case that each aspheric surface having an annular shape is provided between the annulus of a step portion and the annulus of another step portion, or in the vicinity of the effective diameter wherein such aspheric surface is referred to as an annular belt-like aspheric surface, a head means a distance between the crossing point of an extension from an annular belt-like aspheric surface toward the optical axis 4 according to Formula 4 described hereinafter and the optical axis 4, and the apex of the surface of the objective lens in which the annular belt-like aspheric surface is formed. For example, there is $\gamma_{21}$ (the head of the step portion 21) or $\gamma_{22}$ (the head of the step portion 22) in FIG. 3. This distance is along the optical axis 4.

When a numerical aperture $NA_1$ of the objective lens in recording or reading the first optical disk and a numerical aperture $NA_2$ of the objective lens in recording or reading the second optical disk satisfy $NA_1 > NA_2$, it is preferred that the head (e.g., $\gamma_{21}$ in FIG. 3) of the step portion having the smallest inner diameter (21 in FIG. 1) among the step portions satisfies the following Formula 3.

$$(j-0.1)\lambda_1/(n_1-1) \leq \gamma \leq (j+0.1)\lambda_1/(n_1-1) \qquad \text{Formula 3}$$

This step portion is a step portion having function to produce a phase difference to light having the second wavelength (i.e., to shift the phase of light having the second wavelength), which is referred to as the step portion Y. It is necessary to correct the aberration with respect to the second wavelength within a range of $NA_2$ having a limited range. If the head of this step portion does not satisfy Formula 3, the recording or reading of the second optical disk may not be conducted well.

It is preferable that there is a relation that $N_W + N_X + N_Y$ is from 8 to 13 among the number $N_W$ of annuli of the step portions W, the number $N_X$ of annuli of at least one step portion X and the number $N_Y$ of annuli of at least one step portion Y, where $N_W$ represents a natural number, $N_X$ is 0 (zero) or a natural number and $N_Y$ is 0 (zero) or a natural number.

If the number in sum is less than 8, the on-axial spherical aberration may not be corrected well. Further, in consideration that effective diameters of the first and second surfaces of the objective lens are generally 5.0 mm or less, the formation of the step portions exceeding 13 may be difficult. Preferably, the number of $N_W + N_X + N_Y$ is from 9 to 13.

Figure 4:
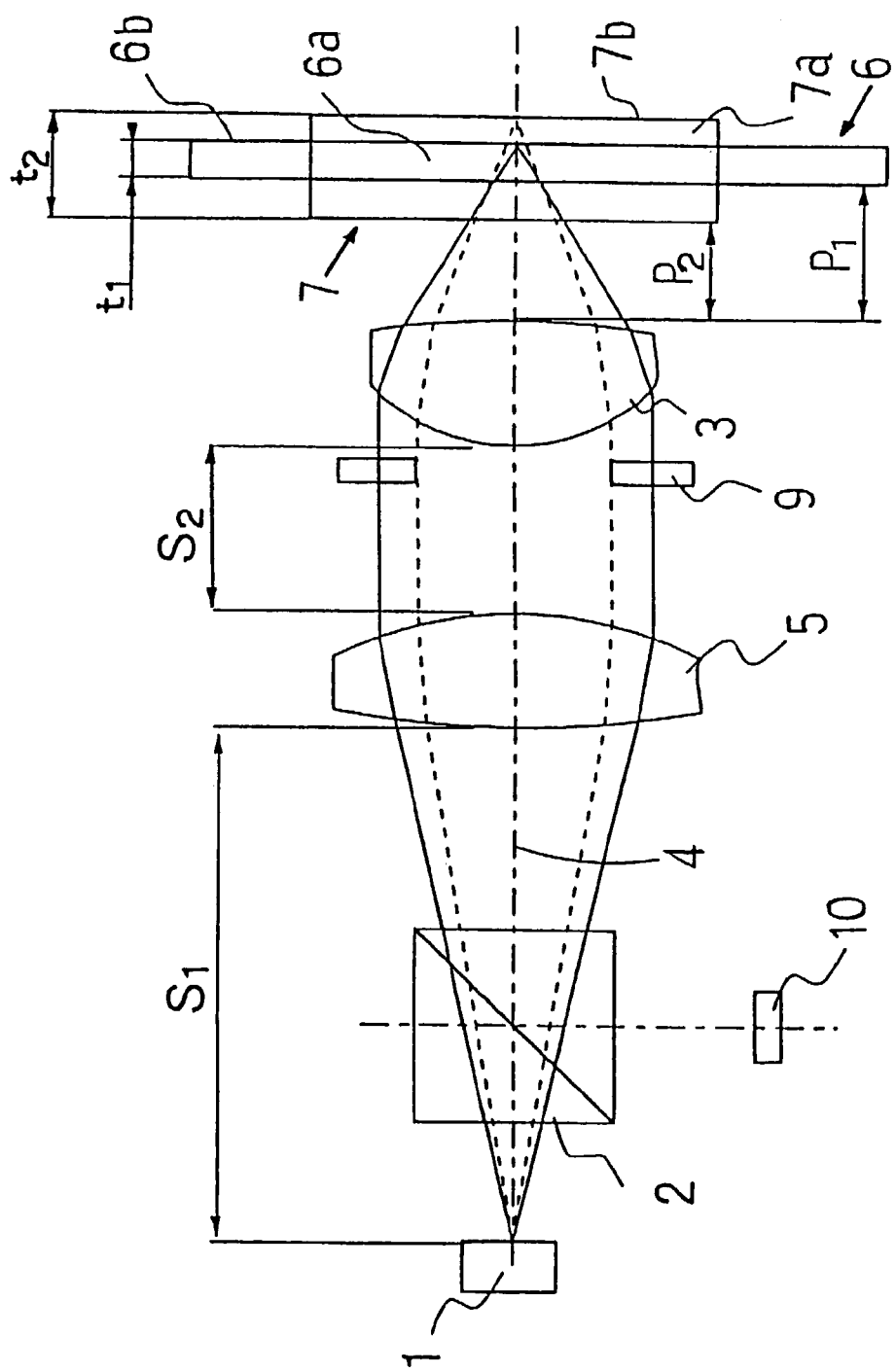
FIG. 4: a structural diagram showing an embodiment of the optical device of the present invention

FIG. 4 is a diagram showing an embodiment of the optical device according to the present invention. In FIG. 4, reference numeral 1 designates a light source, numeral 2 designates an optical medium having a reflecting function, numeral 3 designates an objective lens, numeral 5 designates an auxiliary lens, numeral 6 designates a first optical disk, numeral 6a designates a transparent substrate of the first optical disk 6 (hereinbelow, referred to as the first transparent substrate), numeral 6b designates the data recording surface of the first optical disk 6 (hereinbelow, referred to as the first data recording surface), numeral 7 designates a second optical disk, numeral 7a designates a transparent substrate of the second optical disk 7 (hereinbelow, referred to as the second transparent substrate), numeral 7b designates the data recording surface of the second optical disk 7 (hereinbelow, referred to as the second data recording surface), numeral 9 designates an aperture, numeral 10 designates a light receiving element, character $S_1$ designates the distance on the optical axis from the light source 1 to the surface (first surface) at a light source side of the auxiliary lens 5, and character $S_2$ designates the distance on the optical axis from the surface (the second surface) at an optical disk side of the auxiliary lens 5 to the first surface of the objective lens 3.

In the optical device shown in FIG. 4, the numerical aperture $NA_1$ of the objective lens 3 in recording or reading the first optical disk by using the first wavelength and the numerical aperture $NA_2$ of the objective lens in recording or reading the second optical disk by using the second wavelength, satisfy $NA_1 > NA_2$.

Figure 5:
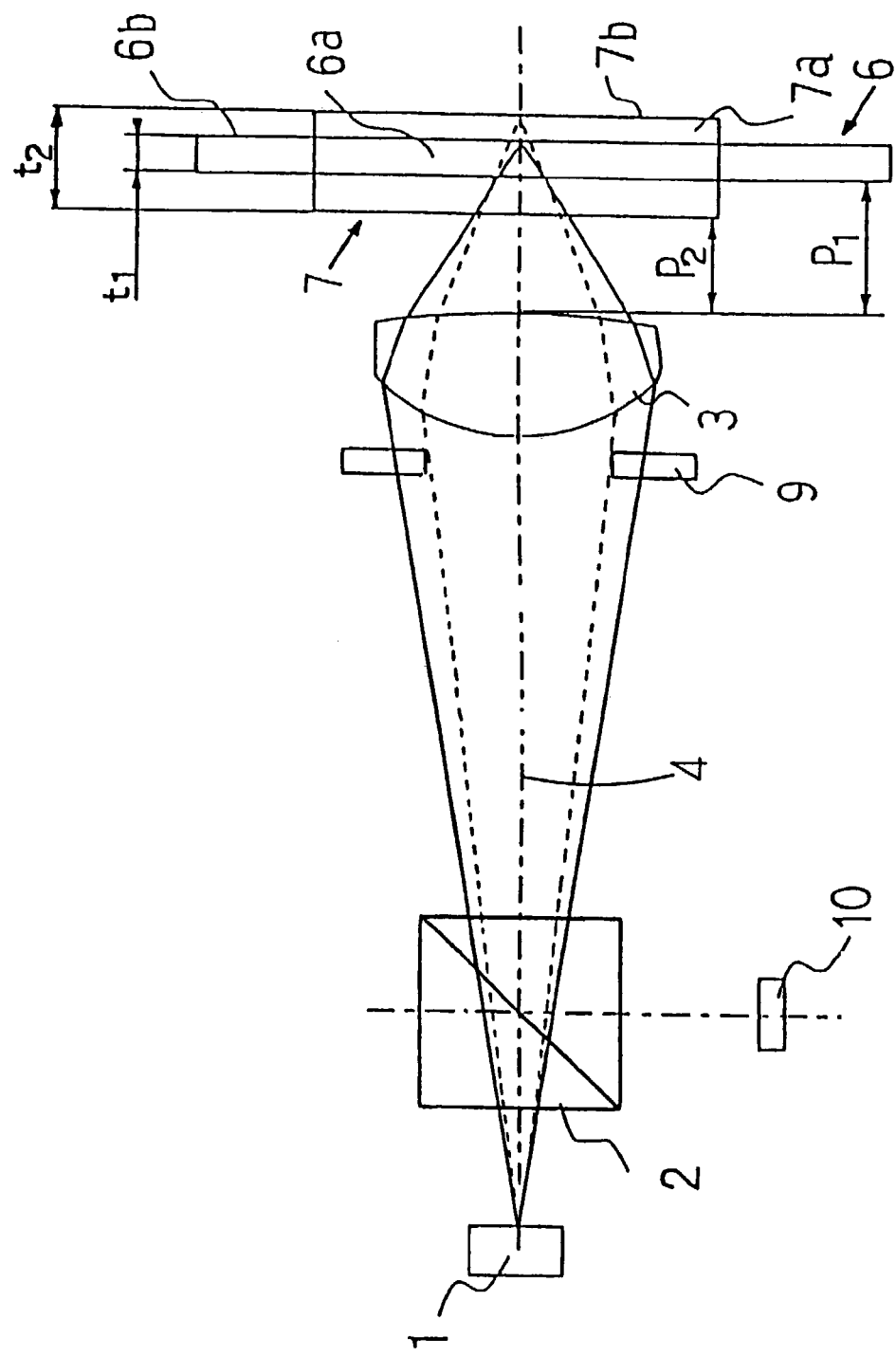
FIG. 5: a structural diagram of an embodiment of the optical device separate from that in FIG. 4

FIG. 5 is a diagram showing an embodiment separate from that shown in FIG. 4. In the optical device shown in FIG. 5, light from the light source 1 is converged to the data recording surface of the optical disk by only the objective lens 3.

In FIG. 4, light having the first wavelength emitted from the light source 1 is successively passed through the optical medium 2, the auxiliary lens 5 and the objective lens 3 to be introduced into and converged on the first data recording surface 6b. In FIG. 5, since the auxiliary lens 5 is not provided, light having the first wavelength is successively passed through the optical medium 2 and the objective lens 3 to be introduced into and converged on the second data recording surface 6b.

In FIG. 4, light having the second wavelength emitted from the light source 1 is successively passed through the optical medium 2, the auxiliary lens 5 and the objective lens 3 to be introduced into and converged on the second data recording surface 7b. In FIG. 5, since the auxiliary lens 5 is not provided, light having the first wavelength is successively passed through the optical medium 2 and the objective lens 3 to be introduced into and converged on the second data recording surface 7b.

The light having the first wavelength reflected by the first data recording surface 6b and the light having the second wavelength reflected by the second data recording surface 7b are returned on light paths on which they have propagated, and are reflected by the optical medium 2 to be received by the light receiving element 10.

The optical systems of the optical devices shown in FIGS. 4 and 5 form a finite type optical system as a whole, respectively. The objective lens 3 in FIG. 4 may be an infinite type lens when the auxiliary lens is a collimeter lens. The objective lens 3 in FIG. 5 is a finite type lens. It is because light from the light source located in a range of a finite distance with respect to an optical disk is converged to the data recording surface of the optical disk. The objective lens 3 includes an objective lens designed as an infinite type which is usable also as a finite type even in a case that a finite type lens can be used.

Further, marks representing digital signals are recorded in the first data recording surface 6b and the second data recording surface 7b. When a dimension of 1 pit for each mark is several μm or less, the optical system of the optical device of the present invention has a diffraction-limited performance in order to achieve precise recording or reading.

As the light source 1, a laser light source or the like may be mentioned, for example. Assumed that the first optical disk 6 is a DVD and the second optical disk 7 is a CD, a laser light source having a wavelength of 785 nm may be used for CD, and a laser light source having a wavelength of 655 nm may be used for DVD, for example. However, wavelengths of the light sources are not limited to the above-mentioned 655 nm and 785 nm.

In the optical device shown in FIG. 4, the combination of the auxiliary lens 5 and the objective lens 3 is optimized with respect to the thickness $t_1$ of the first transparent substrate 6a so that the light having the first wavelength is well converged on the data recording surface 6b, and the combination of the auxiliary lens 5 and the objective lens 3 is optimized with respect to the thickness $t_2$ of the second transparent substrate 7a so that the light having the second wavelength is well converged on the second data recording surface 7b.

In other words, in the combination of the auxiliary lens 5 and the objective lens 3 in FIG. 4, correction of the aberration is properly carried out with respect to the first wavelength, the object-image distance and the thickness $t_1$ of the first transparent substrate 6a, and the aberration characteristics of the optical system for recording or reading the first optical disk 6 by using the light having the first wavelength are optimized either in off-axial or on-axial.

Further, in the combination of the auxiliary lens 5 and the objective lens 3 in FIG. 4, correction of the aberration is properly carried out with respect to the second wavelength, the object-image distance and the thickness $t_2$ of the second transparent substrate 7a, and the aberration characteristics of the optical system for recording or reading the second optical disk 7 by using the light having the second wavelength are optimized either in off-axial or on-axial. The auxiliary lens 5 is determined so that the optimum aberration can be obtained when the objective lens 3 is used in combination.

In the optical device shown in FIG. 5, the objective lens 3 is optimized with respect to the thickness $t_1$ of the first transparent substrate 6a so that the light having the first wavelength is well converged on the first data recording surface 6b, and the objective lens 3 is optimized with respect to the thickness $t_2$ of the second transparent substrate 7a so that the light having the second wavelength is well converged on the second data recording surface 7b.

In other words, in the objective lens 3 in FIG. 5, correction of the aberration is properly carried out with respect to the first wavelength, the object-image distance and the thickness $t_1$ of the first transparent substrate 6a, and the aberration characteristics of the optical system for recording or reading the first optical disk 6 by using the light having the first wavelength are optimized either in off-axial or on-axial.

Further, in the objective lens 3 in FIG. 5, correction of the aberration is properly carried out with respect to the second wavelength, the object-image distance and the thickness $t_2$ of the second transparent substrate 7a, and the aberration characteristics of the optical system for recording or reading the second optical disk 7 by using the light having the second wavelength are optimized either in off-axial or on-axial.

Thus, the recording or reading of the first optical disk 6 and the second optical disk 7 in which the thickness of the transparent substrate of an optical disk is different from the thickness of the other, are well carried out. Further, the aberration characteristics are influenced by not only the thickness of the transparent substrates, but also the refractive index of the transparent substrates although the degree of influence is slight.

In a case that the objective lens as shown in FIG. 1 is used in the optical device shown in FIG. 4, it is preferable that a combination of the auxiliary lens 5, an aspheric surface in the surface including an apex in a surface of the objective lens 3 and an aspheric surface in the surface including an apex in the other surface of the objective lens 3 is so determined that the on-axial spherical aberration is from $0.08\lambda_1$ to $0.25\lambda_1$ in RMS value when data in the data recording surface of the first optical disk 6 are recorded or read and that the on-axial spherical aberration is from $0.08\lambda_2$ to $0.25\lambda_2$ in RMS value when data in the data recording surface of the second optical disk 7 are recorded or read.

When the on-axial spherical aberration is $0.08\lambda_1$ or more and $0.08\lambda_2$ in RMS value, there is little possibility that the off-axial coma aberration would not be corrected. When it is $0.25\lambda_1$ or less and $0.25\lambda_2$ or less, the objective lens 3 can easily be manufactured because correction of the aberration can be achieved even when the number of step portions is small, and an increase in the number of the step portions can be prevented.

In a case that the objective lens as shown in FIG. 1 is used in the optical system shown in FIG. 4, it is preferable that the optical system comprising a combination of at least one selected from annular belt-like aspheric surfaces (for instance, annular belt-like aspheric surfaces 21a, 22a, 23a, 24a, 25a, 26a, 27a, 28a, 29a, 210a and 211a) formed in a surface of the objective lens, an aspheric surface in the surface including an apex in a surface of the objective lens 3, which is opposite to the surface in which the annular belt-like aspheric surfaces are formed, and the auxiliary lens 5, is so determined that the off-axial coma aberration in an image height of 0.05 mm is $0.03\lambda_1$ or less in RMS value when data in the data recording surface 6b of the first optical disk 6 are recorded or read by using the light having the first wavelength and that the off-axial coma aberration in an image height of 0.05 mm is $0.03\lambda_2$ or less in RMS value when data in the data recording surface 7b of the second optical disk 7 are recorded or read by using the light having the second wavelength.

When the off-axial coma aberration in an image height of 0.05 mm is $0.03\lambda$ or less, an allowable range in an inclination or a shift of axis from the optical axis of the light source, the auxiliary lens, the objective lens or the optical disk is expanded to 0.1% or more in comparison with the case that the off-axial coma aberration is more than $0.03\lambda$. A more preferable range of the off-axial coma aberration in an image height of 0.05 mm is $0.01\lambda$ or less. In this case, the allowable range is expanded to 0.5% or more in comparison with the case that the off-axial coma aberration is more than $0.01\lambda$.

In a case that the objective lens shown in FIG. 1 is used in the optical device shown in FIG. 5, it is preferable that a combination of an aspheric surface in the surface including an apex in a surface of the objective lens and an aspheric surface in the surface including an apex in the other surface of the objective lens is so determined that the on-axial spherical aberration is from $0.08\lambda_1$ to $0.25\lambda_1$ in RMS value when data in the data recording surface of the first optical disk 6 are recorded or read and that the on-axial spherical aberration is from $0.08\lambda_2$ to $0.25\lambda_2$ in RMS value when data in the data recording surface of the second optical disk 7 are recorded or read.

When the on-axial spherical aberration is $0.08\lambda_1$ or more and $0.08\lambda_2$ or more in RMS value, there is little possibility that the off-axial coma aberration can not be corrected. When it is $0.25\lambda_1$ or less and $0.25\lambda_2$ or less, the objective lens 3 can easily be manufactured because correction of the aberration can be achieved even when the number of the step portions is small and an increase of the number of the step portions can be prevented.

In a case that the objective lens as shown in FIG. 1 is used in the optical device shown in FIG. 5, it is preferable that the optical system comprising a combination of at least one of annular belt-like aspheric surfaces (for instance, annular belt-like aspheric surfaces 21a, 22a, 23a, 24a, 25a, 26a, 27a, 28a, 29a, 210a and 211a in FIG. 1) formed in a surface of the objective lens 3 and an aspheric surface in the surface including an apex in a surface of the objective lens 3, which is opposite to the surface in which the annular belt-like aspheric surfaces are formed is so determined that the off-axial coma aberration in an image height of 0.05 mm is $0.03\lambda_1$ or less in RMS value when data in the data recording surface 6b of the first optical disk 6 are recorded or read by using the light having the first wavelength and that the off-axial coma aberration in an image height of 0.05 mm is $0.03\lambda_2$ or less in RMS value when data in the data recording surface 7b of the second optical disk 7 are recorded or read by using the light having the second wavelength.

When the off-axial coma aberration in an image height of 0.05 mm is $0.03\lambda$ or less, an allowable range in an inclination or a shift of axis from the optical axis of the light source, the objective lens or the optical disk is expanded to 0.1% or more in comparison with the case that it is more than 0.03λ. A more preferable range of the off-axial coma aberration in an image height of 0.05 mm is 0.01λ or less. In this case, the allowable range is expanded to 0.5% or more in comparison with that it is more than 0.01λ.

When the lateral magnification in the combination of the auxiliary lens 5 and the objective lens 3 which corresponds to the combination of the light having the first wavelength and the first transparent substrate 6a in the optical device shown in FIG. 4, is indicated by $\beta_1$, the lateral magnification of the objective lens 3 in combination which corresponds to the combination of the light having the first wavelength and the first transparent substrate 6a in the optical device shown in FIG. 5, is also indicated by $\beta_1$, the lateral magnification in the combination of the auxiliary lens 5 and the objective lens 3 which corresponds to the combination of the light having the second wavelength and the second transparent substrate 7a in the optical device shown in FIG. 4, is indicated by $\beta_2$, and the lateral magnification of the objective lens 3 in combination which corresponds to the combination of the light having the second wavelength and the second transparent substrate 7a in the optical device as shown in FIG. 5, is also indicated by $\beta_2$, it is preferable that both conditions described in the following Formulae (A) and (B) are satisfied.

(A) $0.05 \leq |\beta_1| \leq 0.3$ and (B) $0.05 \leq |\beta_2| \leq 0.3$.

In case that $0.05 \leq |\beta_1|$ and $0.05 \leq |\beta_2|$ are not satisfied, the object-image distance becomes too long so that miniaturization of the optical device becomes difficult. Further in case that $|\beta_1| \leq 0.3$ and $|\beta_2| \leq 0.3$ are not satisfied, correction of the aberration becomes difficult.

Further, in the optical device shown in FIG. 4, it is preferable that the distance $S_1$ on the optical axis from the light source 1 to the surface, at a side of the light source 1, of the auxiliary lens 5 is $8 \text{ mm} \leq S_1 \leq 25 \text{ mm}$. When $S_1$ is less than 8 mm, correction of the aberration becomes difficult. On the other hand, when $S_1$ exceeds 25 mm, miniaturization of the optical device becomes difficult.

As an example of the optical medium 2, there are a beam splitter, half mirror, prism etc., for example. The optical medium 2 is provided as the case requires. In the optical devices shown in FIGS. 4 and 5, the optical medium 2 may not be provided so that light from the light source 1 is incident directly to the objective lens 3. Further, means for supplying data in the data recording surface of the optical disk to the light receiving element are not limited to those as shown in FIGS. 4 and 5.

The aperture 9 functions to change a numerical aperture (NA). The reason why the aperture 9 is provided is that when a numerical aperture used for the first optical disk 6 is different from a numerical aperture for the second optical disk 7 in recording or reading, the numerical apertures have to be adjusted by the aperture 9. when a numerical aperture used for the first optical disk 6 is the same as a numerical aperture for the second optical disk 7, the aperture 9 is generally unnecessary. As to the aperture 9, there is a mechanical aperture or an optical aperture, which is, however, not limited thereto.

When $NA_1 > NA_2$ is established between a numerical aperture $NA_1$ of the objective lens used for the first optical disk and a numerical aperture $NA_2$ of the objective lens used for the second optical disk, a step portion may be provided, instead of the aperture 9, in an annular belt-like region having the center coincident with the optical axis, in a or both surfaces of the objective lens to prevent the light having the second wavelength from passing through to thereby stop down the light to the numerical aperture $NA_2$.

In FIG. 4, the auxiliary lens 5 is constituted by a single lens. However, the auxiliary lens 5 is not limited to have such structure, and it may comprise a plurality of lenses.

In the above, description has been made as to recording or reading two kinds of optical disk. However, the present invention is not limited thereto, and recording or reading can be conducted to three or more kinds of optical disk wherein thicknesses of these transparent substrates are different from each other. Further, the optical disk used in the present invention is not limited to DVD or CD, but may be another kind of optical disk.

In the optical devices shown in FIGS. 4 and 5, light having the first wavelength and light having the second wavelength are emitted from a single light source 1. However, the present invention is not limited thereto, and light sources for emitting the light having the first wavelength and the light having the second wavelength may be provided separately.

Generally, a synthetic resin is used as materials for the auxiliary lens 5 and the objective lens 3. However, it is not always limited to use the synthetic resin, and glass may be used. Further, an autofocusing driving means may be provided for the objective lens in the optical device of the present invention.

Now, the present invention will be described with reference to Examples.

An optical device as shown in FIG. 4 was prepared on the premise of recording or reading CD and DVD wherein DVD ($t_1$=0.60 mm) was used as the first optical disk 6 and CD ($t_2$=1.20 mm) was used as the second optical disk 7.

A laser light source for emitting light having a wavelength of 655 nm was used for reading or recording DVD and a laser light source for emitting light having a wavelength of 785 nm was used for reading or recording CD. As to the optical medium 2, a beam splitter made of a material of BK7 and having a thickness of 3.00 mm was used. The transparent substrate of DVD was designed to have a refractive index of 1.580 with the wavelength of 655 nm. The transparent substrate of CD was designed to have a refractive index of 1.573 with the wavelength of 785 nm. Shape of the aspheric surfaces formed in the objective lens 3 including each annular belt-like aspheric surface were determined according to the following Formula 4. In Formula 4, i is 2, 4, 6, 8 or 10; j is 1 or 2; h is a height from the optical axis; $z_j$ is a distance from a surface contact with the apex of the j th aspheric surface to a point having a height h on the aspheric surface, and $r_j$, $k_j$ and $a_{i,j}$ are coefficients of the j th surface respectively.

$$z_j = (1/r_j)h^2 / \left[1 + \{1 - (1+k_j)(1/r_j)^2 h^2\}^{0.5}\right] + \sum_j a_{i,j} h^i \quad \text{Formula 4}$$

EXAMPLE 1

Comparative Example

Figure 6:
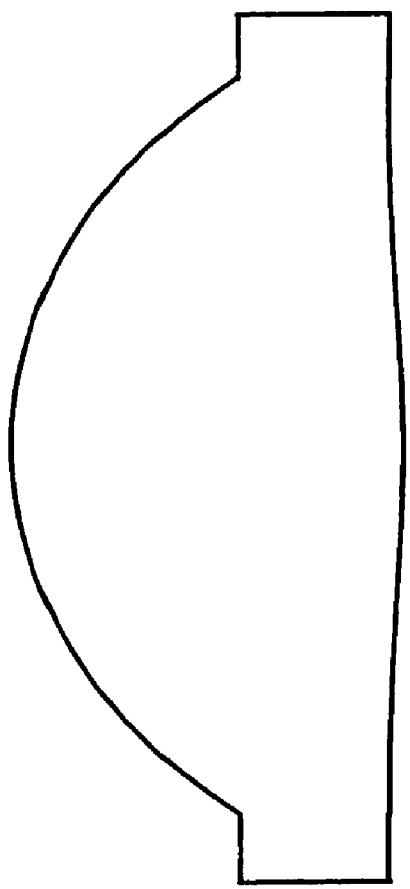
FIG. 6: a cross-sectional view showing the objective lens according to Example 1

The shape of the objective lens 3 was such shape as shown in FIG. 6. CD and DVD are both so designed as not to correct the on-axial spherical aberration but to correct well the off-axial coma aberration.

Specifications and numerical values of the optical device and the objective lens in Example 1 are shown in upper frames of Table 1. In the upper frames of Table 1, $f_1$, indicates the focal length of the objective lens 3 at a wavelength of 655 nm, $f_2$ indicates the focal length of the objective lens 3 at a wavelength of 785 nm, $d_1$, indicates the thickness of the center of the objective lens 3, $n_1$, indicates the refractive index of the objective lens 3 at a wavelength of 655 nm, and $n_2$ indicates the refractive index of the objective lens 3 at a wavelength of 785 nm.

Coefficients of the aspheric surface in the first surface of the objective lens in Example 1 are shown in middle frames of Table 1, and coefficients of the aspheric surface in the second surface of the objective lens in Example 1 are shown in lower frames of Table 1. In Tables described hereinbelow, E-1 means $10^{-1}$.

TABLE 1

| | | | |
|---|---|---|---|
| $f_1 =$ | 3.337 mm | $d_1 =$ | 2.25 mm |
| $f_2 =$ | 3.356 mm | $n_1 =$ | 1.5405 |
| $NA_1 =$ | 0.625 | $n_2 =$ | 1.5372 |
| $NA_2 =$ | 0.525 | | |
| $r_1 =$ | 1.400228 | $a_{2,1} =$ | $-1.2368619E-1$ |
| $k_1 =$ | $-1.052361$ | $a_{4,1} =$ | $1.0004486E-2$ |
| | | $a_{6,1} =$ | $7.656559E-4$ |
| $r_2 =$ | $-3.84781$ | $a_{2,2} =$ | $6.0585863E-2$ |
| $k_2 =$ | $-10$ | $a_{4,2} =$ | $6.3972816E-2$ |
| | | $a_{6,2} =$ | $-1.1545647E-3$ |

A collimeter lens was used as the auxiliary lens and the shape of the aspheric surface of the auxiliary lens was determined according to Formula 4. Coefficients of the aspheric surface of the auxiliary lens are shown in upper frames of Table 2. In an upper frame of Table 2, $f_{c1}$ indicates the focal length at a wavelength of 655 nm, $f_{c2}$ indicates the focal length at a wavelength of 785 nm, $d_c$, indicates the thickness at the center, $n_{c1}$, indicates the refractive index at a wavelength of 655 nm, and $n_{c2}$ indicates the refractive index at a wavelength of 785 nm. In Examples 2 to 4, the auxiliary lens as indicated in the upper frames of Table 2 was also used.

Specifications of an optical system comprising the auxiliary lens as indicated in the upper frames of Table 2 and the objective lens in Table 1 are indicated in lower frames of Table 2. In a lower frame of Table 2, $P_1$ indicates the distance (operating distance) between the second surface of the objective lens and the surface at an objective lens side of the first optical disk 6 at a wavelength of 655 nm, and $P_2$ indicates the distance (operating distance) between the second surface of the objective lens and the surface at an objective lens side of the second optical disk 7.

TABLE 2

| | | | |
|---|---|---|---|
| $f_{C1} =$ | 18.00 mm | $r_1 =$ | 37.05092 |
| $f_{C2} =$ | 18.11 mm | $r_2 =$ | $-12.43312$ |
| $d_C =$ | 2.45 mm | $k_1 =$ | 19.57529 |
| $n_{C1} =$ | 1.5405 | $k_2 =$ | $-1.007722$ |
| $n_{C2} =$ | 1.5372 | $a_{2,1} =$ | $-2.1713973E-3$ |
| $S_1 =$ | 18.01 mm | $a_{2,2} =$ | $-6.4513367E-4$ |
| $S_2 =$ | 5.25 mm | $a_{4,1} =$ | $8.6229452E-5$ |
| | | $a_{4,2} =$ | $1.201001E-4$ |
| | | $a_{6,1} =$ | 0.0 |
| | | $a_{6,2} =$ | 0.0 |

| | Optical system for CD | Optical system for DVD |
|---|---|---|
| Aperture (diameter) | 3.54 mm | 4.20 mm |
| Lateral magnification | $-0.184$ | $-0.183$ |

TABLE 2-continued

| | | |
|---|---|---|
| of optical system ($\beta_1, \beta_2$) | | |
| $P_1, P_2$ | 1.38 mm | 1.72 mm |

Figure 7:
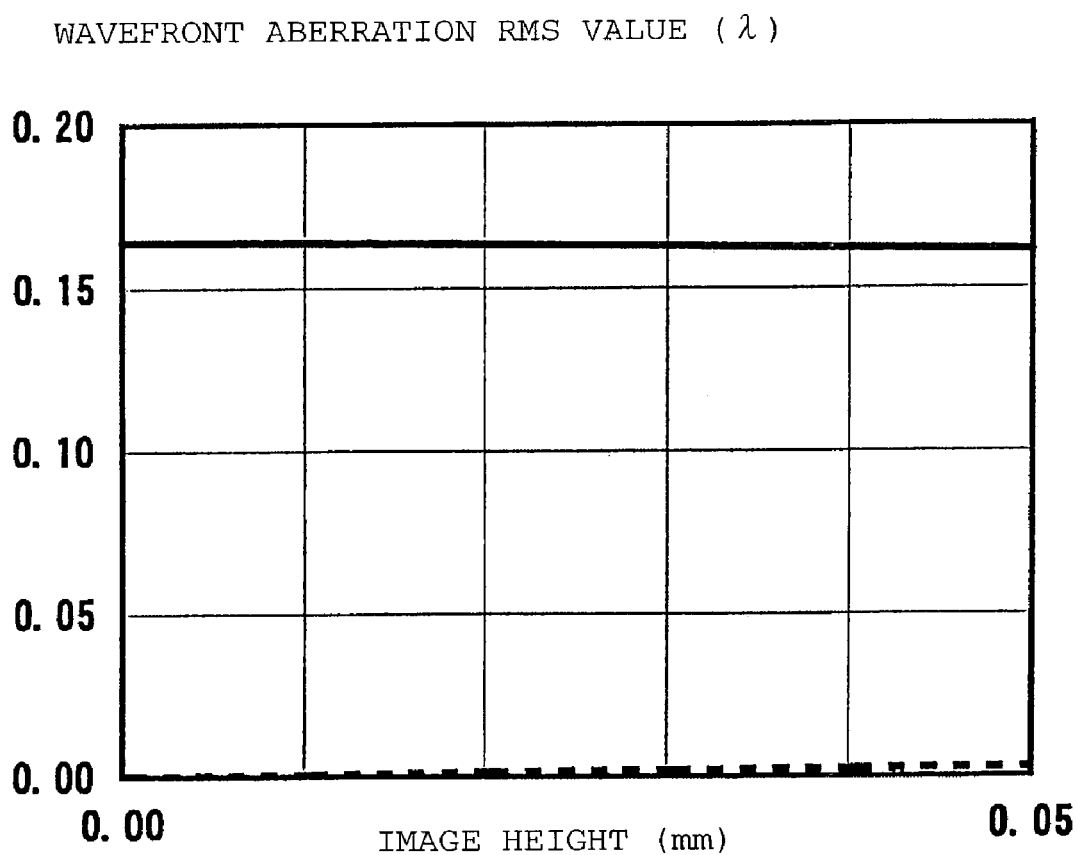
FIG. 7: an off-axial wavefront aberration characteristic diagram of an optical system for CD in Example 1
Figure 8:
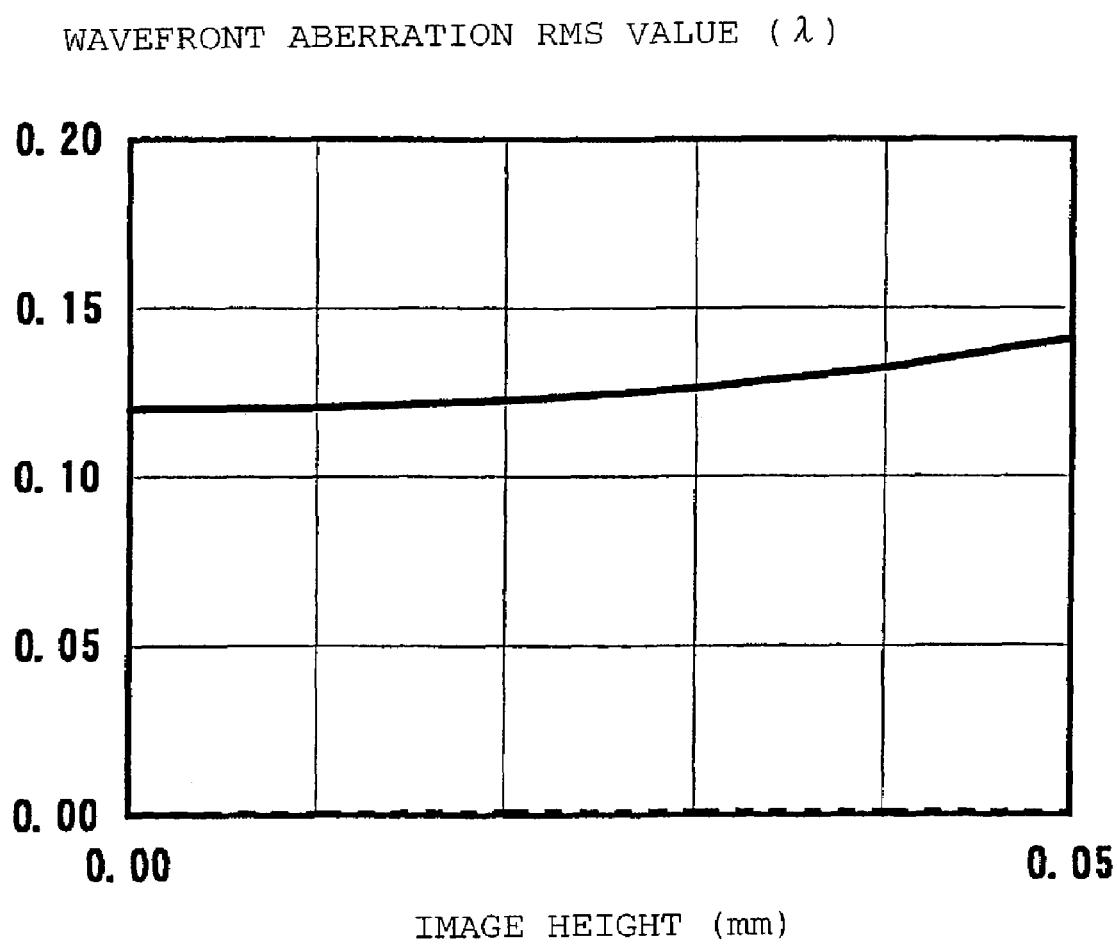
FIG. 8: an off-axial wavefront aberration characteristic diagram of an optical system for DVD in Example 1

FIG. 7 shows the off-axial wavefront aberration characteristics of the optical system for CD. In FIG. 7, the solid line shows the wavefront aberration including all kinds of aberration. The broken line shows only the off-axial coma aberration in the off-axial wavefront aberration. FIG. 8 shows the off-axial wavefront aberration characteristics of the optical system for DVD. The solid line and the broken line have the same meaning as in FIG. 7. Further, in the aberration characteristic diagrams described hereinbelow, solid lines and broken liens have the same meaning as in FIG. 7. The aberration characteristic diagram on each Example and aberration values in Tables described hereinbelow are all based on calculated values.

An objective lens and an auxiliary lens in Example 1 were prepared by injection-molding a plastic material, and an optical device in Example 1 was fabricated. When the recording or reading of DVD and CD were performed in the optical device, accurate recording or reading could not be performed for both DVD and CD.

EXAMPLE 2

Comparative Example

Figure 9:
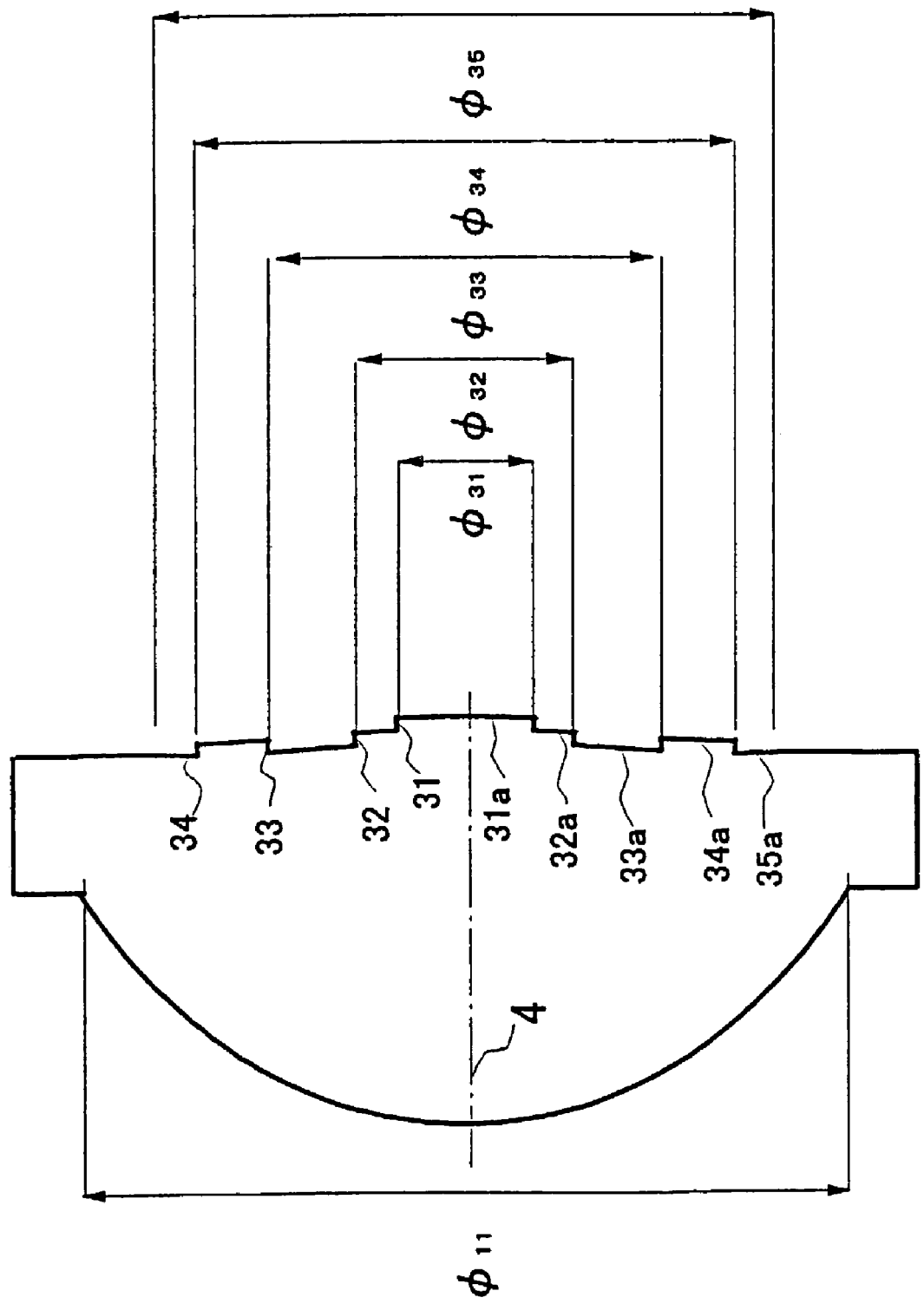
FIG. 9: a cross-sectional view showing the objective lens in Example 2

An objective lens was formed to have such shape as shown in FIG. 9 wherein specifications of the lens were the same as those of Example 1 as described in the upper frames of Table 1, which are basic specifications. A phase shifter was provided in a second surface of the objective lens in order to correct the on-axial spherical aberration for DVD. The shape of the first surface of the objective lens was the same as the first surface of the objective lens in Example 1. In the following, an aspheric surface in the second surface of the objective lens will be described by using the same reference numerals in FIG. 9.

An aspheric surface 31a in the surface including the apex in the second surface of the objective lens was formed in the same manner as the aspheric surface in the surface including the apex in the second surface of the objective lens in Example 1. The off-axial coma aberration in recording or reading DVD or CD is corrected well by the first surface and the aspheric surface 31a of the objective lens in FIG. 9.

The off-axial coma aberration in recording or reading DVD or CD is corrected well by the first surface and annular belt-like aspheric surfaces 32a, 33a, 34a and 35a of the objective lens in FIG. 9. The annular belt-like aspheric surface 32a and the annular belt-like aspheric surface 34a have the same head, and coefficients of the aspheric surfaces are also the same.

Coefficients of aspheric surface of the annular belt-like aspheric surfaces 32a, 34a are shown in a left upper frame of Table 3, and coefficients of aspheric surface of the annular belt-like aspheric surfaces 33a, 35a are shown in a right upper frame of Table 3. Each of the heads is shown in middle frames of Table 3. Further, $\phi_{31}$, $\phi_{32}$, $\phi_{32}$, $\phi_{33}$, $\phi_{34}$ and $\phi_{35}$ are shown in lower frames of Table 3. Since the heads $\gamma_{31}$, $\gamma_{32}$, $\gamma_{33}$ and $\gamma_{34}$ shown in upper frames of Table 4 are calculated as j=0 (zero) in Formula 1, the phase of a laser light having a wavelength of 785 nm for CD is not shifted, and only the phase of a laser light having a wavelength of 655 nm for DVD is shifted. Accordingly, accurate recording or reading of CD can not be performed although accurate recording or reading of DVD can be performed.

TABLE 3

| $r_2 =$ | −3.8529795 | $r_2 =$ | −3.853765 |
|---|---|---|---|
| $k_2 =$ | −10 | $k_2 =$ | −10 |
| $a_{2,2} =$ | 6.057611E−2 | $a_{2,2} =$ | 6.070106E−2 |
| $a_{4,2} =$ | 6.394815E−3 | $a_{4,2} =$ | 6.358029E−3 |
| $a_{6,2} =$ | −1.152933E−3 | $a_{6,2} =$ | −1.147420E−3 |

| | |
|---|---|
| Head $\gamma_{31}$ of annular step portion 31 | 1.46 μm |
| Head $\gamma_{32}$ of annular step portion 32 | 2.92 μm |
| Head $\gamma_{33}$ of annular step portion 33 | 1.46 μm |
| Head $\gamma_{34}$ of annular step portion 34 | 2.92 μm |
| $\phi_{31}$ | 0.760 mm |
| $\phi_{32}$ | 1.152 mm |
| $\phi_{33}$ | 2.146 mm |
| $\phi_{34}$ | 2.984 mm |
| $\phi_{35}$ | 3.492 mm |

Figure 10:
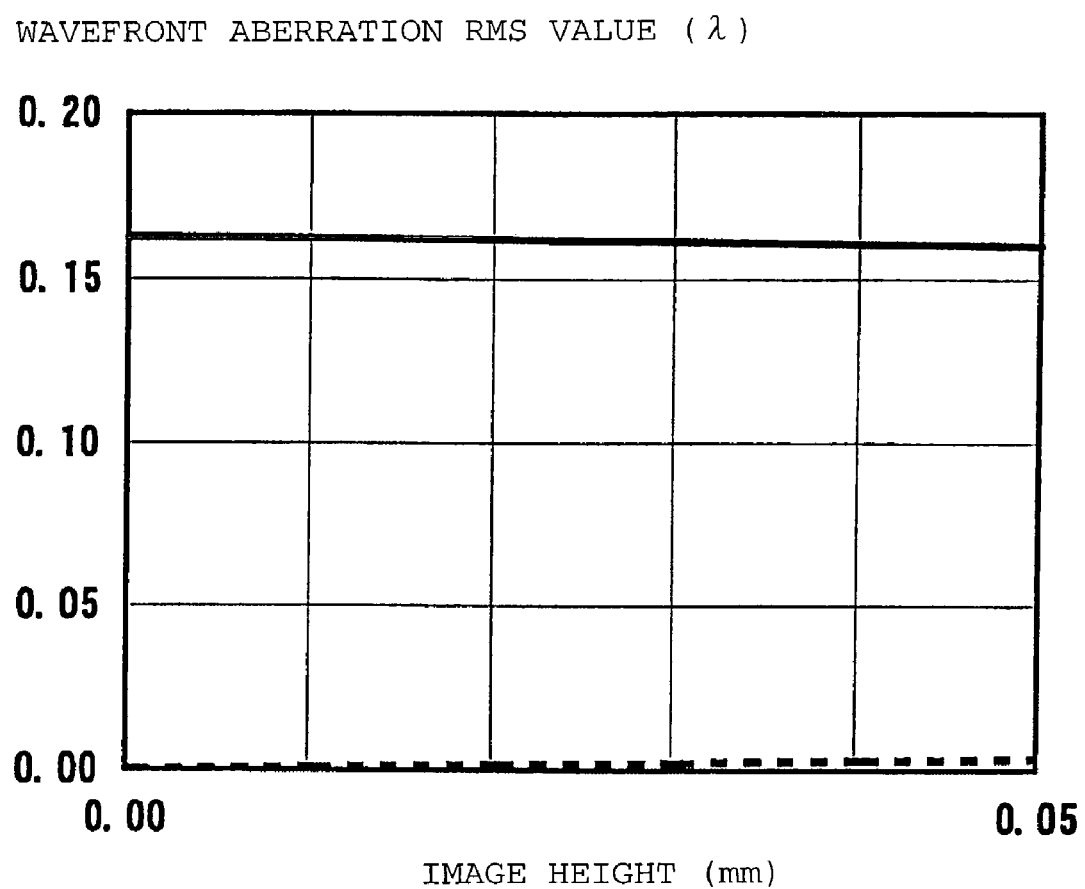
FIG. 10: an off-axial wavefront aberration characteristic diagram of an optical system for CD in Example 2
Figure 11:
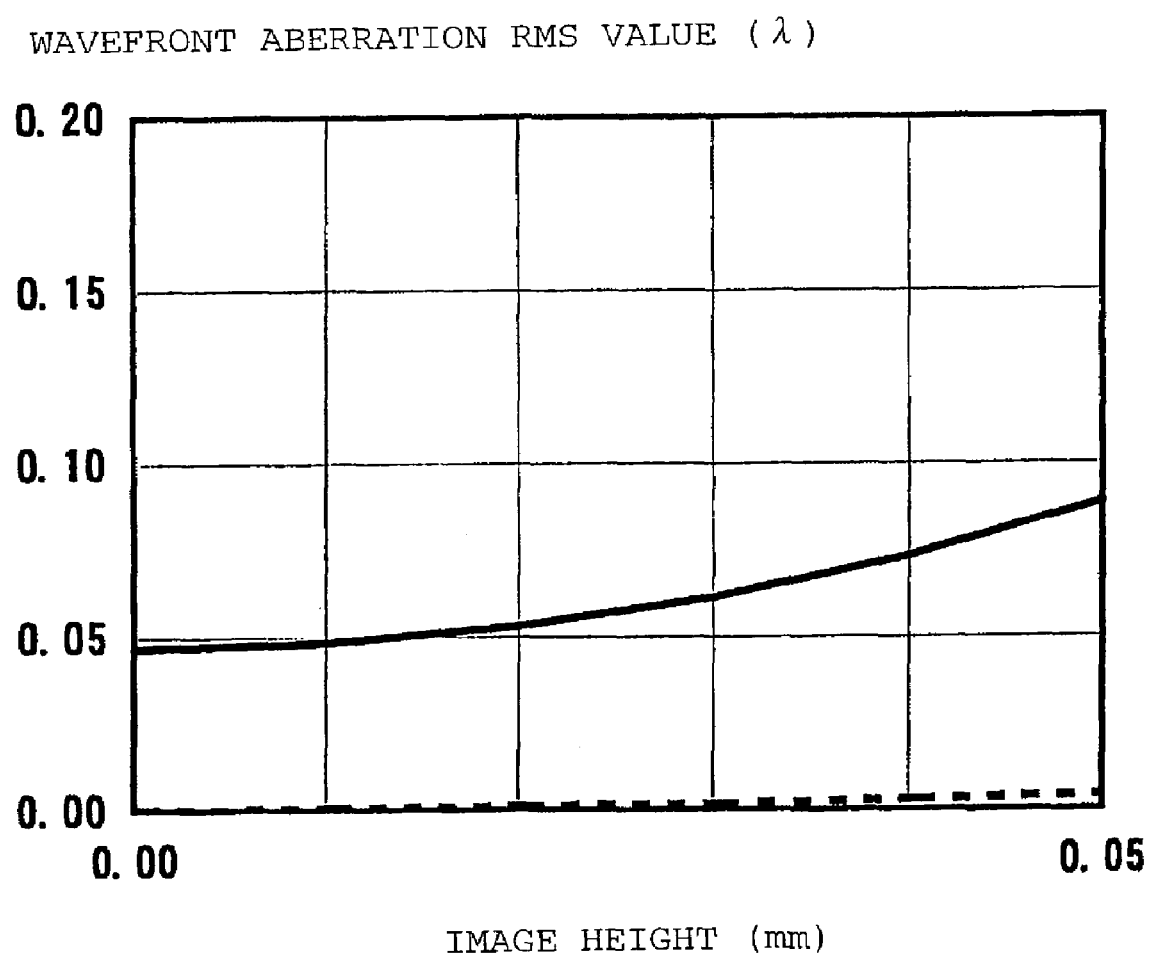
FIG. 11: an off-axial wavefront aberration characteristic diagram of an optical system for DVD in Example 2

FIG. 10 shows the off-axial wavefront aberration characteristics of the optical system for CD. Further, FIG. 11 shows the off-axial wavefront aberration characteristics of the optical system for DVD. An objective lens 3 having the shape as in Example 2 and an auxiliary lens 5 were prepared by injection-molding a plastic material, and an optical device in Example 3 was fabricated. When recording or reading was conducted to DVD and CD in this optical device, accurate recording or reading could not be performed for CD although accurate recording or reading could be performed for DVD.

EXAMPLE 3

Comparative Example

Figure 12:
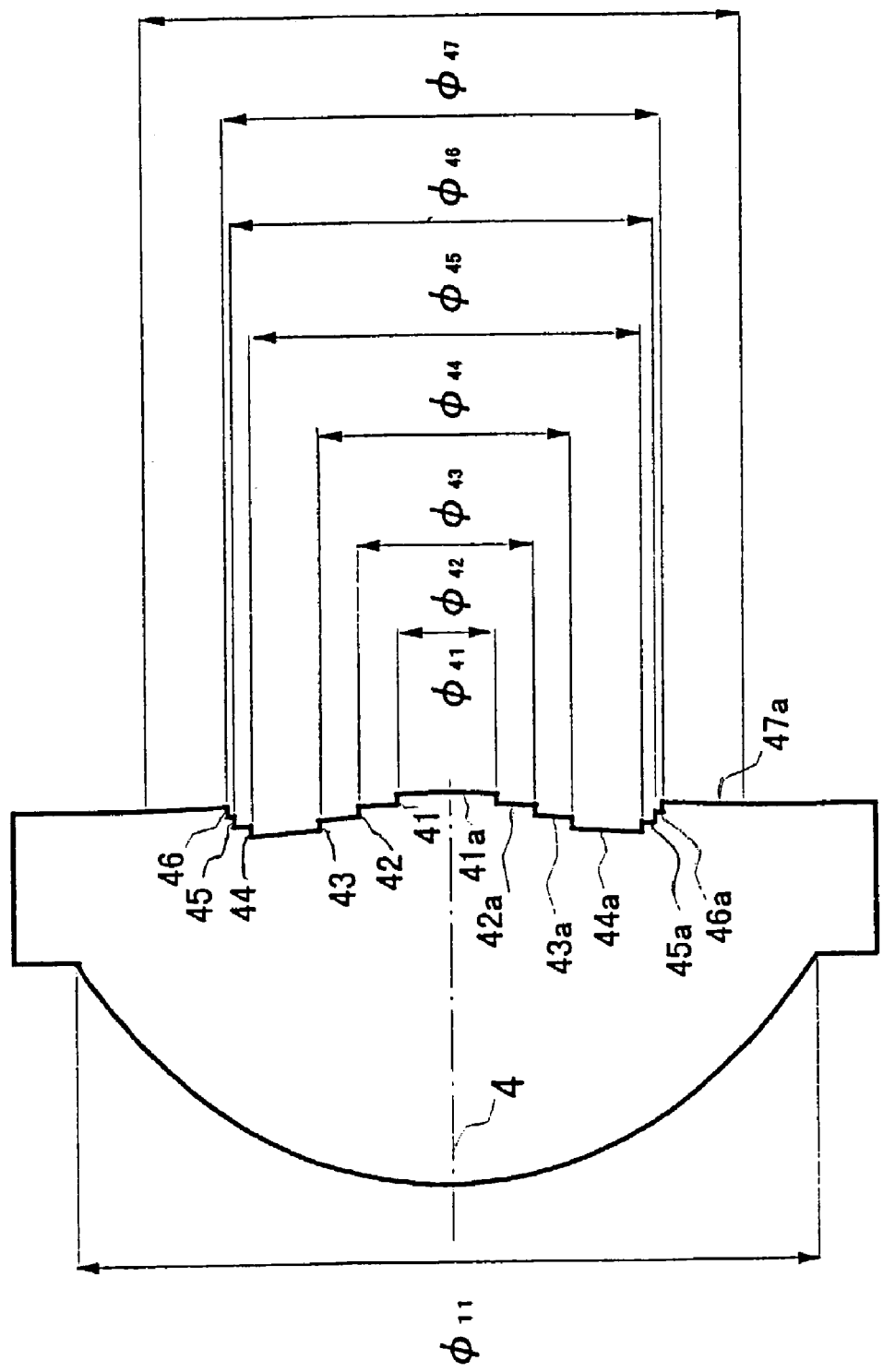
FIG. 12: a cross-sectional view showing the objective lens in Example 3

An objective lens was formed to have such shape as shown in FIG. 12 wherein specifications of the lens were the same as those of Example 1 as described in the upper frames of Table 1, which are basic specifications. A phase shifter was provided in a second surface of the objective lens as shown in FIG. 12, in order to correct the on-axial spherical aberration for CD. The shape of a first surface of the objective lens was the same as the first surface of the objective lens in Example 1. In the following, an aspheric surface in the second surface of the objective lens will be described by using the same reference numerals as in FIG. 12.

An aspheric surface 41a in the surface including the apex in the second surface of the objective lens was formed in the same manner as the aspheric surface in the surface including the apex in the second surface of the objective lens in Example 1. The combination of the aspheric surface in the first surface and the aspheric surface 41a of the objective lens in this Example was not so designed as to be able to correct the on-axial spherical aberration for both CD and DVD, but was so designed as to correct well the off-axial coma aberration for both CD and DVD, in the same manner as the objective lens in Example 1.

Shape of aspheric surface of annular belt-like aspheric surfaces 42a, 43a, 44a, 45a and 46a are determined in combination of the aspheric surface of the first surface and in consideration of the respective heads so that the off-axial coma aberration can be corrected well for both CD and DVD. The shape of aspheric surface of an annular belt-like aspheric surface 47a was determined in combination of the aspheric surface of the first surface so that the off-axial coma aberration can be corrected well for both CD and DVD.

A step portion 41 and a step portion 45 have the same head, and a step portion 42 and a step portion 44 have the same head. The aspheric surface 41a and the annular belt-like aspheric surface 47a have the same coefficient of aspheric surface (q.v. Example 1). An annular belt-like aspheric surface 42a and an annular belt-like aspheric surface 46a were formed to have the same coefficient of aspheric surface. An annular belt-like aspheric surface 43a and an annular belt-like aspheric surface 45a have the same coefficient of aspheric surface.

Coefficients of aspheric surface of the annular belt-like aspheric surface 42a and the annular belt-like aspheric surface 46a are shown in a left upper frame of Table 4, coefficients of aspheric surface of the annular belt-like aspheric surface 43a and the annular belt-like aspheric surface 45a are shown in a right upper frame of Table 4, and the coefficient of aspheric surface of the annular belt-like aspheric surface 44a is shown in a left lower frame of Table 4. Heads γ of annular step portions are shown in upper frames of Table 5. Further, $\phi_{41}$, $\phi_{42}$, $\phi_{43}$, $\phi_{44}$, $\phi_{45}$, $\phi_{46}$ and $\phi_{47}$ are shown in lower frames of Table 5.

Since head $\gamma_{41}$, $\gamma_{42}$, $\gamma_{43}$, $\gamma_{44}$, $\gamma_{45}$ and $\gamma_{46}$ shown in upper frames of Table 5 are calculated as i=0 (zero) in Formula 1, the phase of a laser light having a wavelength of 655 nm usable for DVD is not shifted, and only the phase of a laser light having a wavelength of 785 nm for CD is shifted. Accordingly, accurate recording or reading of DVD can not be performed although accurate recording or reading of CD can be performed.

TABLE 4

| $r_2 =$ | −3.8507155 | $r_2 =$ | −3.8509334 |
|---|---|---|---|
| $k_2 =$ | −10 | $k_2 =$ | −10 |
| $a_{2,2} =$ | 6.062271E−2 | $a_{2,2} =$ | 6.074373E−2 |
| $a_{4,2} =$ | 6.382655E−3 | $a_{4,2} =$ | 6.343845E−3 |
| $a_{6,2} =$ | −1.151587E−3 | $a_{6,2} =$ | −1.145419E−3 |
| $r_2 =$ | −3.8508415 | | |
| $k_2 =$ | −10 | | |
| $a_{2,2} =$ | 6.087419E−2 | | |
| $a_{4,2} =$ | 6.302380E−3 | | |
| $a_{6,2} =$ | −1.138902E−3 | | |

TABLE 5

| | |
|---|---|
| Head $\gamma_{41}$ of annular step portion 41 | 1.21 μm |
| Head $\gamma_{42}$ of annular step portion 42 | 2.42 μm |
| Head $\gamma_{43}$ of annular step portion 43 | 3.63 μm |
| Head $\gamma_{44}$ of annular step portion 44 | 2.42 μm |
| Head $\gamma_{45}$ of annular step portion 45 | 1.21 μm |
| Head $\gamma_{46}$ of annular step portion 46 | 0.00 μm |
| $\phi_{41}$ | 0.580 mm |
| $\phi_{42}$ | 0.976 mm |
| $\phi_{43}$ | 1.412 mm |
| $\phi_{44}$ | 2.266 mm |
| $\phi_{45}$ | 2.446 mm |
| $\phi_{46}$ | 2.546 mm |
| $\phi_{47}$ (Effective diameter) | 3.492 mm |

Figure 13:
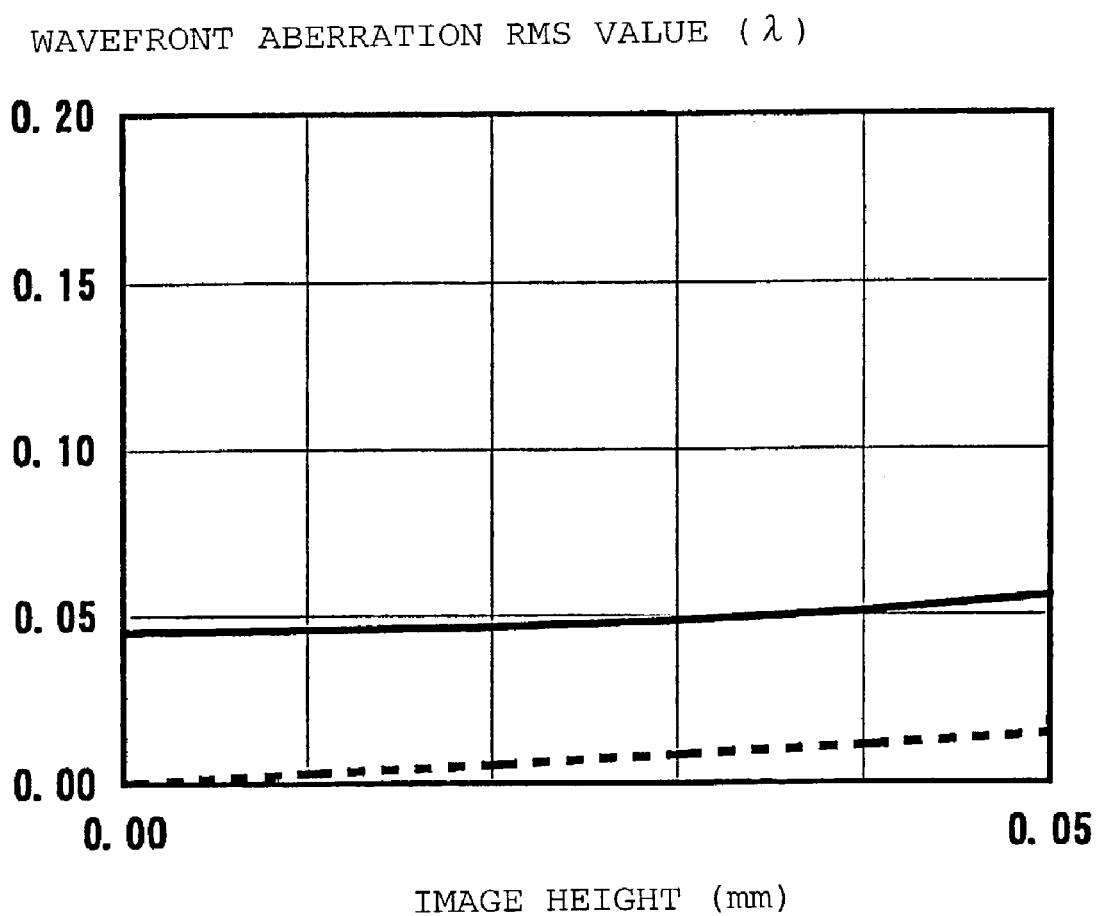
FIG. 13: an off-axial wavefront aberration characteristic diagram of an optical system for CD in Example 3
Figure 14:
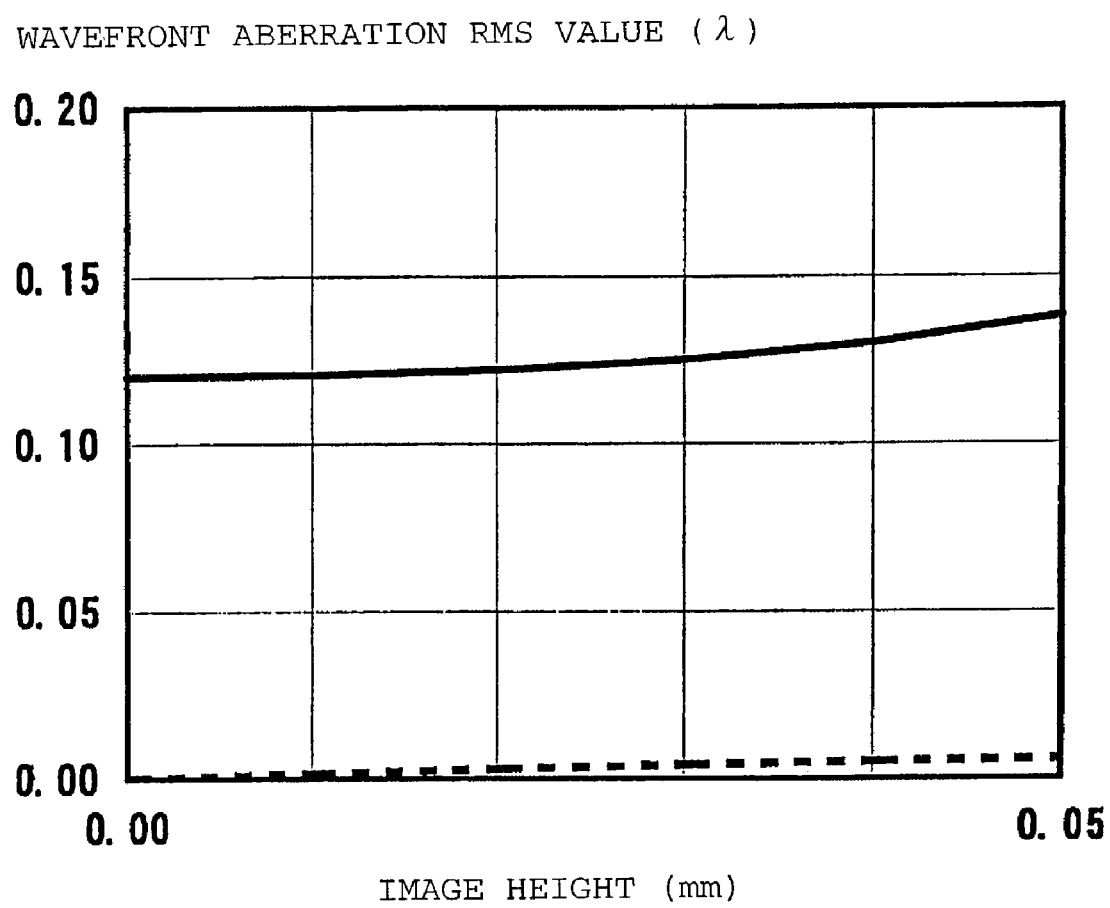
FIG. 14: an off-axial wavefront aberration characteristic diagram of an optical system for DVD in Example 3

FIG. 13 shows the off-axial wavefront aberration characteristics of the optical system for CD. Further, FIG. 14 shows the off-axial wavefront aberration characteristics of the optical system for DVD. An objective lens having the shape in Example 3 and an auxiliary lens were prepared, and an optical device in Example 3 was fabricated. When recording or reading was conducted to DVD and CD in this optical device, accurate recording or reading could be performed for CD. However, accurate recording or reading of DVD could not be performed.

EXAMPLE 4

Present Invention

An objective lens was formed to have such shape of lens as shown in FIG. 1 wherein specifications of the lens were the same as those of Example 1 described in the upper frames of Table 1, which are basic specifications. A first surface of the objective lens was formed in the same manner as the first surface of the objective lens in Example 1. Further, heads γ of annular step portions and the head of an annular belt-like aspheric surface 210*a* are shown in upper frames of Table 6, and diameters of annular step portions are shown in left lower frames of Table 6.

A positional relation between step portions in Example 4 and step portions in Examples 2 and 3 is shown in right lower frames of Table 6. Namely, the lower frames of Table 6 show that the step portions in Example 4 have the same diameter as the step portions in Examples 2 and 3, and the step portions in Example 4 are formed by synthesizing step portions in Example 2 and step portions in Example 3.

TABLE 6

|  |  | i | j |
|---|---|---|---|
| Head $\gamma_{21}$ of annular step portion 21 | 1.21 μm | 0 | 1 |
| Head $\gamma_{22}$ of annular step portion 22 | 2.67 μm | 1 | 1 |
| Head $\gamma_{23}$ of annular step portion 23 | 3.89 μm | 1 | 2 |
| Head $\gamma_{24}$ of annular step portion 24 | 5.35 μm | 2 | 2 |
| Head $\gamma_{25}$ of annular step portion 25 | 6.56 μm | 2 | 3 |
| Head $\gamma_{26}$ of annular step portion 26 | 5.10 μm | 1 | 3 |
| Head $\gamma_{27}$ of annular step portion 27 | 3.89 μm | 1 | 2 |
| Head $\gamma_{28}$ of annular step portion 218 | 2.67 μm | 1 | 1 |
| Head $\gamma_{29}$ of annular step portion 29 | 1.46 μm | 1 | 0 |
| Head $\gamma_{210}$ of annular step portion 210 | 2.92 μm | 2 | 0 |

|  |  | Step portion having the same diameter as the step portion of the objective lens in Example 2 | Step portion having the same diameter as the step portion of the objective lens in Example 3 |
|---|---|---|---|
| $\phi_{21}$ | 0.580 mm |  | $\phi_{41}$ |
| $\phi_{22}$ | 0.760 mm | $\phi_{31}$ |  |
| $\phi_{23}$ | 0.976 mm |  | $\phi_{42}$ |
| $\phi_{24}$ | 1.152 mm | $\phi_{32}$ |  |
| $\phi_{25}$ | 1.412 mm |  | $\phi_{43}$ |
| $\phi_{26}$ | 2.146 mm | $\phi_{33}$ |  |
| $\phi_{27}$ | 2.266 mm |  | $\phi_{44}$ |
| $\phi_{28}$ | 2.446 mm |  | $\phi_{45}$ |
| $\phi_{29}$ | 2.546 mm |  | $\phi_{46}$ |
| $\phi_{210}$ | 2.984 mm | $\phi_{34}$ |  |

TABLE 6-continued

| $\phi_{211}$ | 3.492 mm |
|---|---|

Table 7 shows shapes of aspheric surface of annular belt-like aspheric surfaces 21*a*, 22*a*, 23*a*, 24*a*, 25*a*, 26*a*, 27*a*, 28*a*, 29*a*, 210*a* and 211*a*.

TABLE 7

| Annular belt-like aspheric surface 21a | Having the same coefficient as the aspheric surface in the surface including the apex of the second surface of the objective lens in Example 1 |
|---|---|
| Annular belt-like aspheric surface 22a | Having the same coefficient as the annular belt-like aspheric surface 42a of the objective lens in Example 3 |
| Annular belt-like aspheric surface 23a | $r_2 = -3.8498734,$<br>$k_2 = -10$<br>$a_{2,2} = 6.080284E-2$<br>$a_{4,2} = 6.326211E-3$<br>$a_{6,2} = -1.142893E-3$ |
| Annular belt-like aspheric surface 24a | $r_2 = -3.8512034,$<br>$k_2 = -10$<br>$a_{2,2} = 6.088935E-2$<br>$a_{4,2} = 6.297075E-3$<br>$a_{6,2} = -1.137975E-3$ |
| Annular belt-like aspheric surface 25a | $r_2 = -3.8508623,$<br>$k_2 = -10$<br>$a_{2,2} = 6.105283E-2$<br>$a_{4,2} = 6.245578E-3$<br>$a_{6,2} = -1.129929E-3$ |
| Annular belt-like aspheric surface 26a | $r_2 = -3.8499238,$<br>$k_2 = -10$<br>$a_{2,2} = 6.120625E-2$<br>$a_{4,2} = 6.199294E-3$<br>$a_{6,2} = -1.122996E-3$ |
| Annular belt-like aspheric surface 27a | $r_2 = -3.850121,$<br>$k_2 = -10$<br>$a_{2,2} = 6.104731E-2$<br>$a_{4,2} = 6.249557E-3$<br>$a_{6,2} = -1.130896E-3$ |
| Annular belt-like aspheric surface 28a | Having the same coefficient as the annular belt-like aspheric surface 24a |
| Annular belt-like aspheric surface 29a | Having the same coefficient as the annular belt-like aspheric surface 23a |
| Annular belt-like aspheric surface 210a | Having the same coefficient as the annular belt-like aspheric surface 34a in Example 2 |
| Annular belt-like aspheric surface 211a | Having the same coefficient as the annular belt-like aspheric surface 35a in Example 2 |

Figure 15:
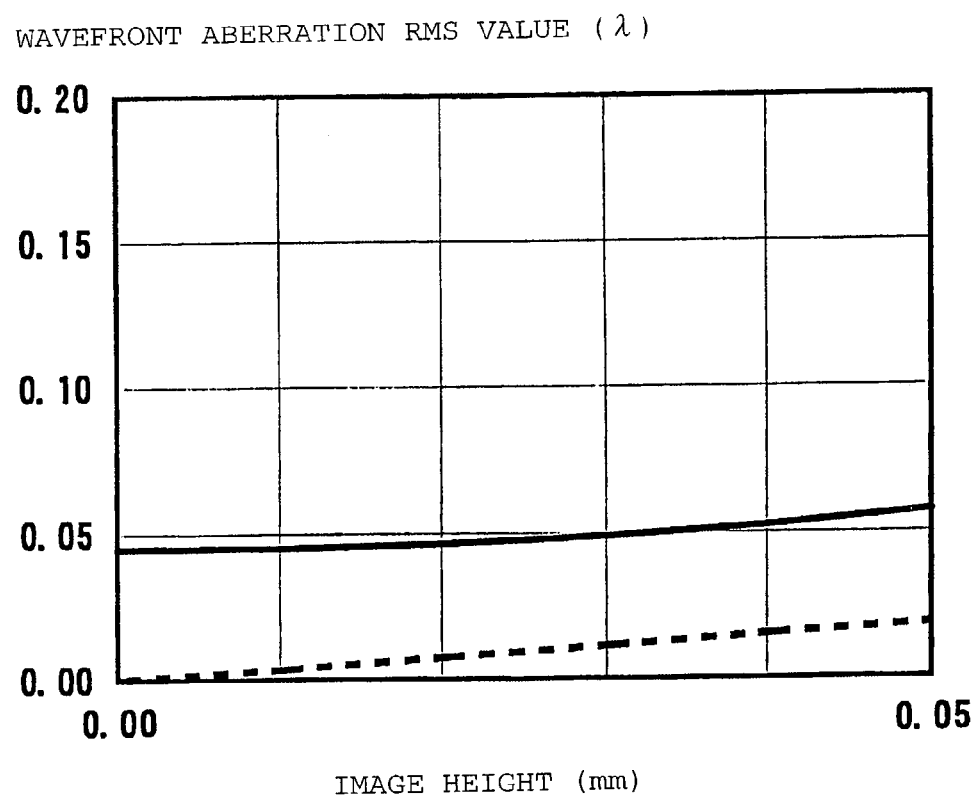
FIG. 15: an off-axial wavefront aberration characteristic diagram of an optical system for CD in Example 4
Figure 16:
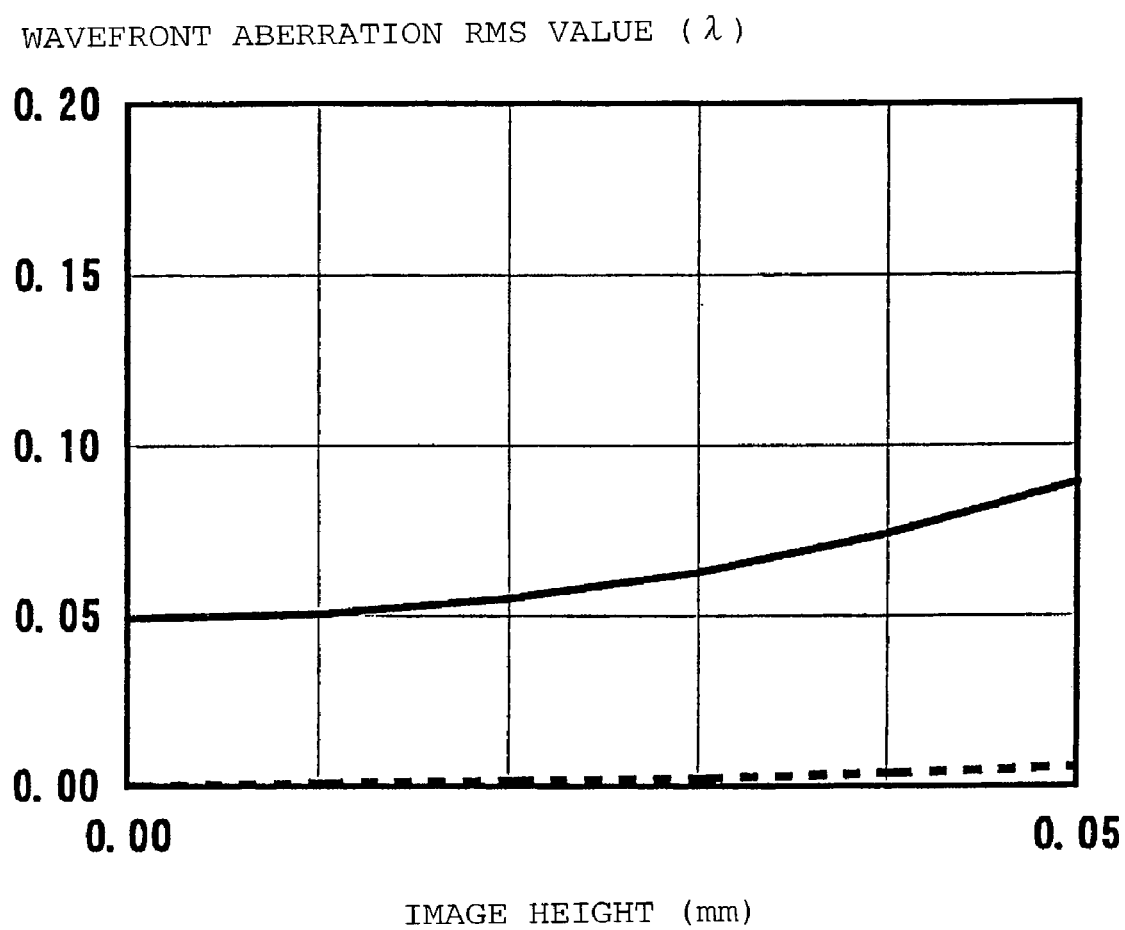
FIG. 16: an off-axial wavefront aberration characteristic diagram of an optical system for DVD in Example 4

FIG. 15 shows the off-axial wavefront aberration characteristics of the optical device for CD. FIG. 16 shows the off-axial wavefront aberration characteristics of the optical device for DVD. An objective lens having the same shape as in Example 4 and an auxiliary lens were prepared and an optical device in Example 4 was fabricated. When recording or reading was conducted to CD and DVD in this optical device, accurate recording or reading could be performed for both CD and DVD.

INDUSTRIAL APPLICABILITY

The objective lens of the present invention is provided with a phase shifter having function to produce a phase difference with respect to light having a first wavelength and light having a second wavelength, in a or both surfaces. Accordingly, when recording or reading is conducted to a first optical disk and a second optical disk, both the on-axial aberration and the off-axial aberration can be corrected well.

Accordingly, the objective lens of the present invention provides excellent on-axial aberration and off-axial aberration even in a case of resulting an inclination from the optical axis or a shift of axis with respect to the light source or the objective lens with the lapse of time. Further, the objective lens can present a highly precise optical device easily, and there is little possibility that the optical performance decreases with the lapse of time.

The entire disclosure of Japanese Patent Application No. 2000-232184 filed on Jul. 31, 2000 including specification, claims, drawings and summary is incorporated herein by reference in its entirety.

What is claimed is:

1. An optical device comprising:
    an objective lens including,
        aspheric surfaces at a first surface and a second surface, and
        a phase shifter provided with annular step portions having a center coincident with an optical axis of the objective lens formed in at least one of the first and second surfaces of the objective lens; and
    a light receiving element, wherein,
    light having a first wavelength is converged to a data recording surface of a first optical disk via the objective lens and reflection light from the data recording surface of the first optical disk is received by the light receiving element in recording or reading the first optical disk,
    light having a second wavelength which is different from the first wavelength is converged to a data recording surface of a second optical disk via the objective lens and reflection light from the data recording surface of the second optical disk is received by the light receiving element in recording or reading the second optical disk,
    the phase shifter is configured to produce a phase difference for reducing on-axial and off-axial aberration resulting from recording or reading the first optical disk with respect to the light having the first wavelength, and
    the phase shifter is configured to produce a phase difference for reducing on-axial and off-axial aberration resulting from recording or reading the second optical disk with respect to the light having the second wavelength.

2. The optical device according to claim 1, wherein a step portion X having function to produce a phase difference with respect only to the light having the first wavelength is formed in a single or both surfaces of the objective lens, the step portion X being an annular step portion X having the center coincident with the optical axis.

3. The optical device according to claim 1, wherein a step portion Y having function to produce a phase difference with respect only to the light having the second wavelength is formed in a single or both surfaces of the objective lens, the step portion Y being an annular step portion Y having the center coincident with the optical axis.

4. The optical device according to claim 1, wherein convex portions or concave portions are formed in a single or both surfaces of the objective lens to constitute a part of or the whole of the step portions W.

5. The optical device according to claim 1, wherein dimensions and a shape of the step portions W of the phase shifter are determined so that the phase difference caused by light having a first wavelength $\lambda_1$ is from $(i-0.1)\lambda_2$ to $(i+0.1)\lambda_2$ when the phase difference is converted into a distance, and the phase difference caused by light having a second wavelength $\lambda_2$ is from $(j-0.1)\lambda_1$ to $(j+0.1)\lambda_1$ when the phase difference is converted into a distance, where i represents a natural number and j represents a natural number.

6. The optical device according to claim 1, wherein the relation of $8 \leq N_W + N_X + N_Y \leq 13$ is established among the number $N_W$ of annuli in the step portions W, the number $N_X$ of annuli in a step portion X and the number $N_Y$ of annuli in a step portion Y, where $N_W$ represents a natural number, $N_X$ represents 0 (zero) or a natural number and $N_Y$ represents 0 (zero) or a natural number.

7. The optical device according to claim 1, wherein the first wavelength is $\lambda_1$ and the second wavelength is $\lambda_2$, and
    a combination of an auxiliary lens, an aspheric surface in the surface including an apex in a surface of the objective lens, and an aspheric surface in the surface including an apex in the other surface of the objective lens is determined so that the on-axial spherical aberration is from $0.08\lambda_1$ to $0.25\lambda_1$ in RMS value in a case that data in the data recording surface of the first optical disk is recorded or read, and that the on-axial spherical aberration is from $0.08\lambda_2$ to $0.25\lambda_2$ in RMS value in a case that data in the data recording surface of the second optical disk is recorded or read.

8. The objective lens according to claim 7, wherein the auxiliary lens is a collimator lens.

9. The objective lens according to claim 1, wherein the first wavelength is $\lambda_1$ and the second wavelength is $\lambda_2$, and
    a combination of an aspheric surface in the surface including an apex in a surface of the objective lens and an aspheric surface in the surface including an apex in the other surface of the objective lens is determined so that the on-axial spherical aberration is from $0.08\lambda_1$ to $0.25\lambda_1$ in RMS value in a case that data in the data recording surface of the first optical disk is recorded or read, and that the on-axial spherical aberration is from $0.08\lambda_2$ to $0.25\lambda_2$ in RMS value in a case that data in the data recording surface of the second optical disk is recorded or read.

* * * * *